United States Patent [19]

Pailen et al.

[11] Patent Number: 4,652,990

[45] Date of Patent: Mar. 24, 1987

[54] PROTECTED SOFTWARE ACCESS CONTROL APPARATUS AND METHOD

[75] Inventors: William Pailen, Derwood; Jim L. Harper, Olney, both of Md.

[73] Assignee: Remote Systems, Inc., Vienna, Va.

[21] Appl. No.: 546,206

[22] Filed: Oct. 27, 1983

[51] Int. Cl.[4] .......................... H04Q 5/00; H04L 9/00
[52] U.S. Cl. ...................................... 364/200; 380/4; 380/24
[58] Field of Search ... 364/200 MS File, 900 MS File; 340/825.3, 825.31, 825.34; 178/22

[56] References Cited

U.S. PATENT DOCUMENTS

| | | | |
|---|---|---|---|
| 3,611,293 | 10/1971 | Constable et al. | 340/149 A |
| 3,761,883 | 9/1973 | Alvarez | 364/200 |
| 3,798,605 | 3/1974 | Feistel | 364/200 |
| 3,846,622 | 11/1974 | Meyer | 235/61.7 B |
| 3,892,948 | 7/1975 | Constable | 340/149 R |
| 3,956,615 | 5/1976 | Anderson et al. | 235/61.7 B |
| 3,985,998 | 10/1976 | Crafton | 235/61.7 B |
| 3,996,449 | 12/1976 | Attanasio et al. | 235/61.7 R |
| 4,025,760 | 5/1977 | Trenkamp | 235/61.7 B |
| 4,123,747 | 10/1978 | Lancto et al. | 340/149 A |
| 4,193,131 | 3/1980 | Lennon et al. | 375/2 |
| 4,214,230 | 7/1980 | Fak et al. | 340/149 A |
| 4,218,738 | 8/1980 | Matyas et al. | 364/200 |
| 4,223,403 | 9/1980 | Konheim et al. | 375/2 |
| 4,227,253 | 10/1980 | Ehrsam et al. | 364/200 |
| 4,238,853 | 12/1980 | Ehrsam et al. | 364/200 |
| 4,238,854 | 12/1980 | Ehrsam et al. | 375/2 |
| 4,259,720 | 3/1981 | Campbell | 364/200 X |
| 4,264,782 | 4/1981 | Konheim | 178/22 |
| 4,268,715 | 5/1981 | Atalla | 178/22 |
| 4,281,215 | 7/1981 | Atalla | 178/22.08 |
| 4,283,599 | 8/1981 | Atalla | 178/22.1 |
| 4,288,659 | 9/1982 | Atalla | 178/22.08 |
| 4,310,720 | 1/1982 | Check, Jr. | 178/22.08 |
| 4,315,101 | 2/1982 | Atalla | 178/22.08 |
| 4,317,957 | 3/1982 | Sendrow | 178/22.08 |
| 4,326,098 | 4/1982 | Bouricius et al. | 178/22.08 |
| 4,386,234 | 5/1983 | Ehrsam et al. | 178/22.09 |
| 4,438,824 | 4/1984 | Mueller-Schloer | 178/22.08 |
| 4,471,163 | 9/1984 | Donald et al. | 364/200 |

*Primary Examiner*—David Y. Eng
*Attorney, Agent, or Firm*—Neuman, Williams, Anderson & Olson

[57] ABSTRACT

A software access control system is disclosed for controlling access to a protected application program. The software access control system comprises first and second processors, each having a terminal or port adapting its processor to be coupled with the other. The first processor is programmed to permit access to the protected application program and comprises a first memory storing the protected application program, a program identification manifestation and a customer identification manifestation. The second processor comprises a second memory for storing a program identification manifestation and a customer identification manifestation, as assigned to the second processor. A user terminal is actuated to transmit an access request message including a requested program identification manifestation to the first processor requesting permission to execute a particular application program. There is disclosed a two-step process of granting access to a protected application program. First, the requested program identification manifestation, as entered on the user terminal, is compared with a program identification manifestation retained within the second processor. If there is a first match, a customer authentication message is transmitted from the first processor to the second processor. In response, the second processor transmits its assigned customer identification manifestation to the first processor, wherein a comparison is made between the retained customer identification manifestation and the assigned customer identification transmission. If there is a second match, access to use and to execute the application program is granted.

12 Claims, 18 Drawing Figures

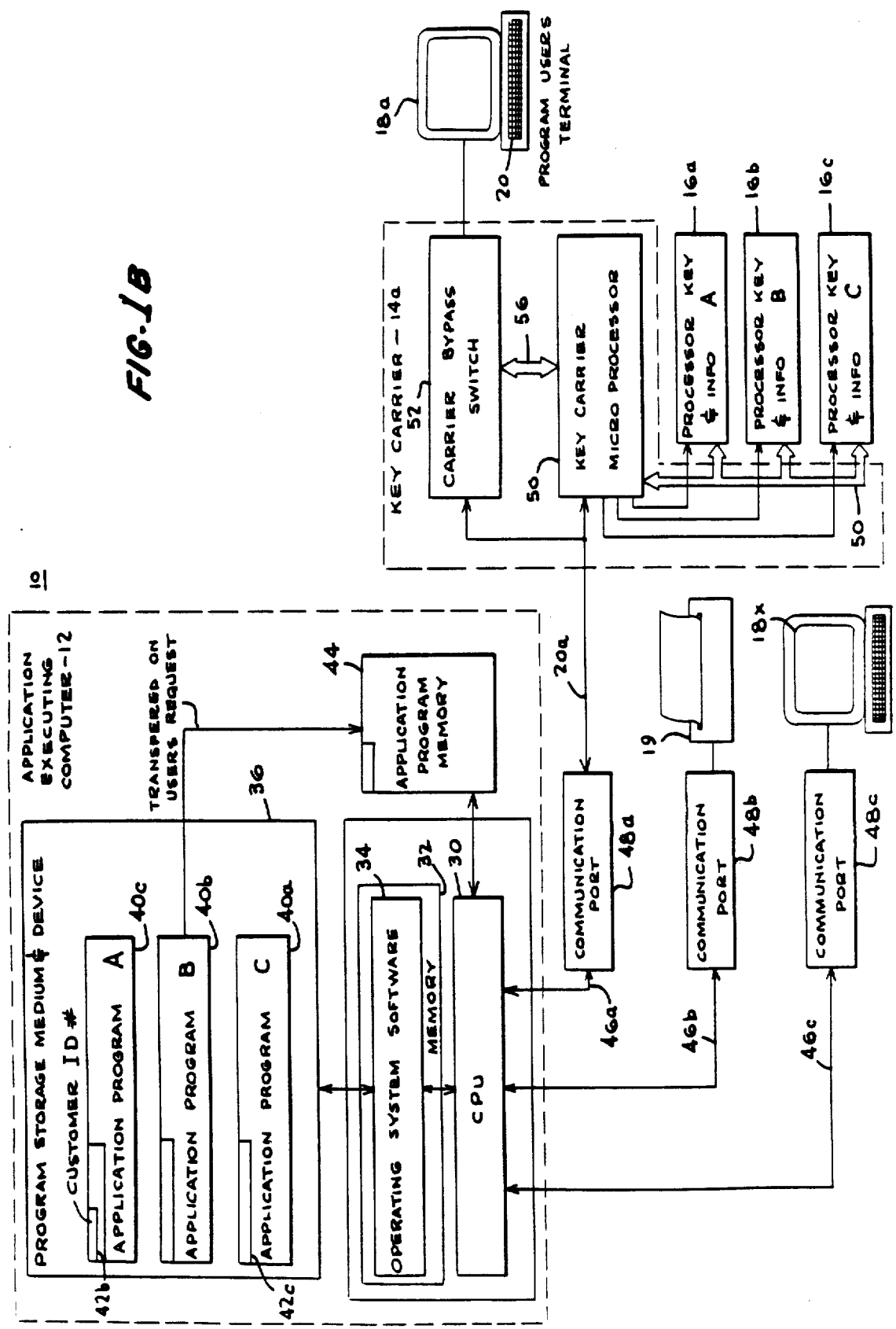

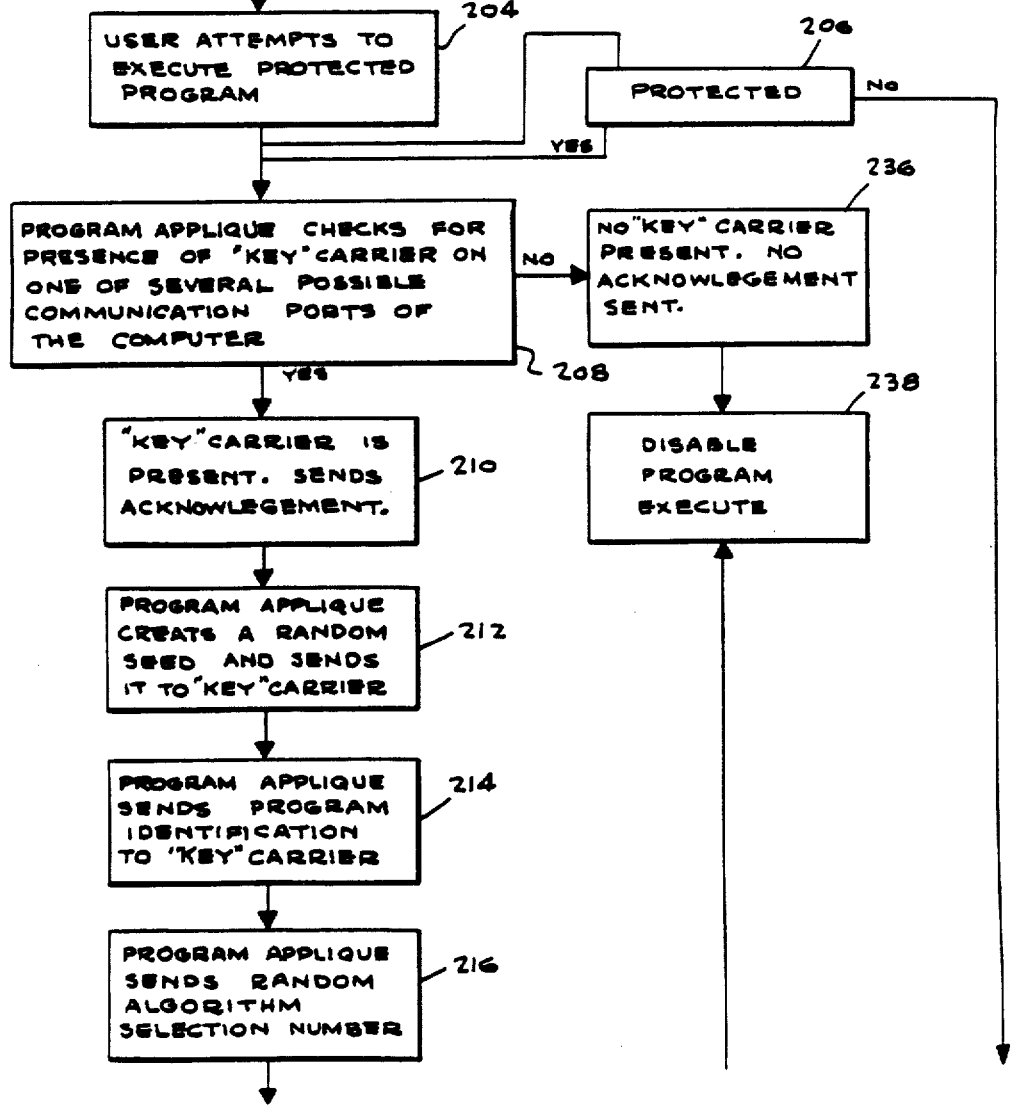

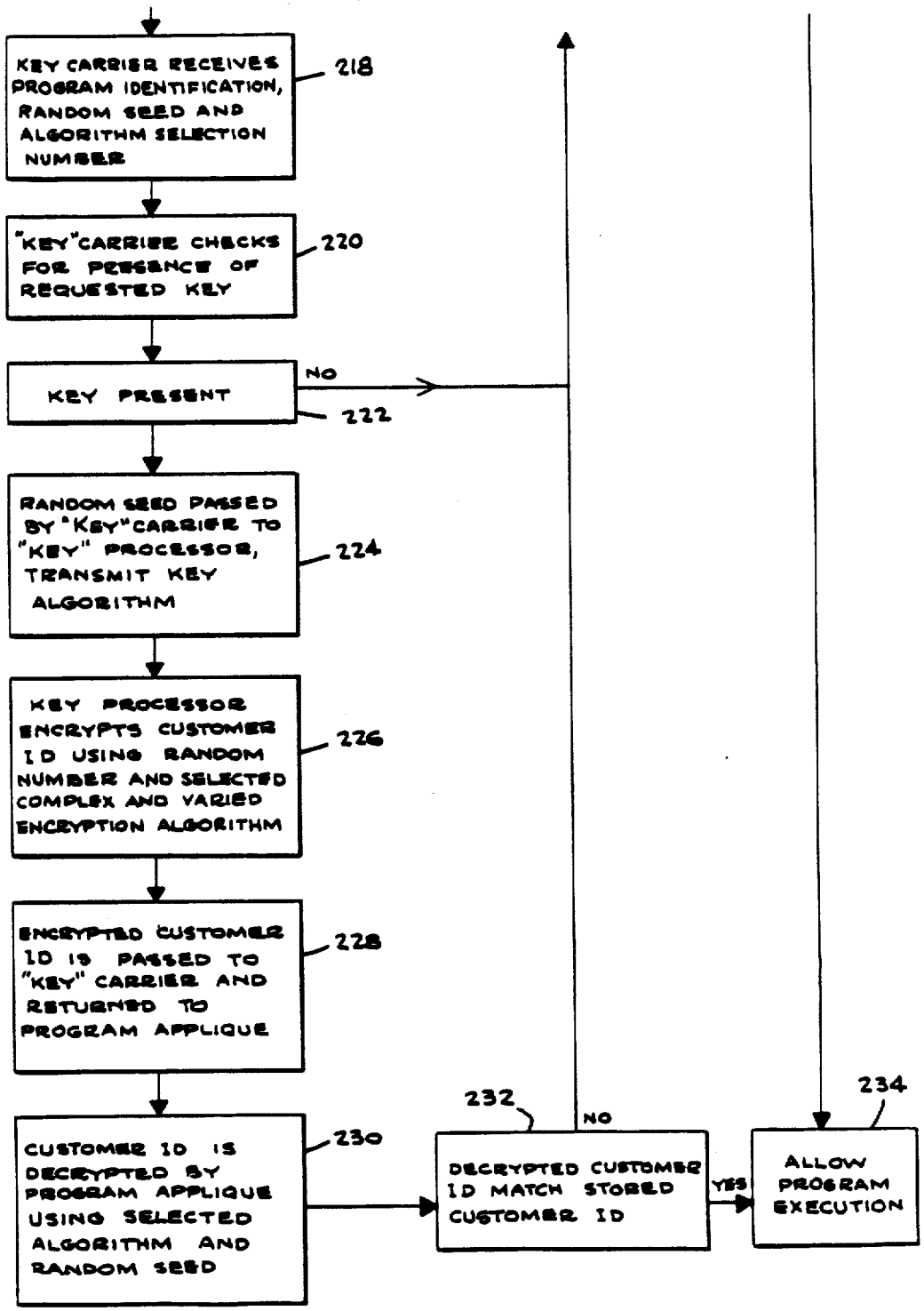

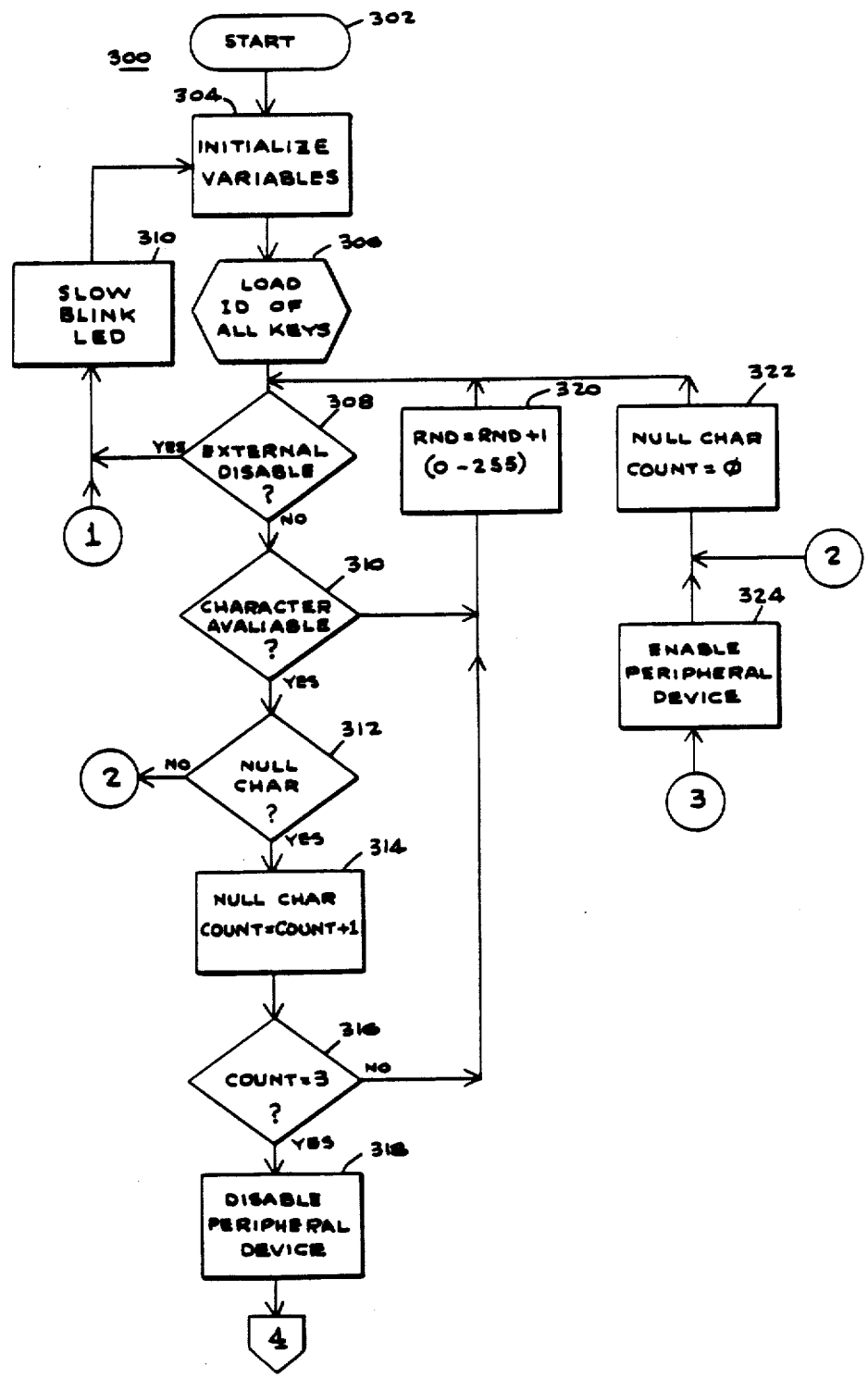

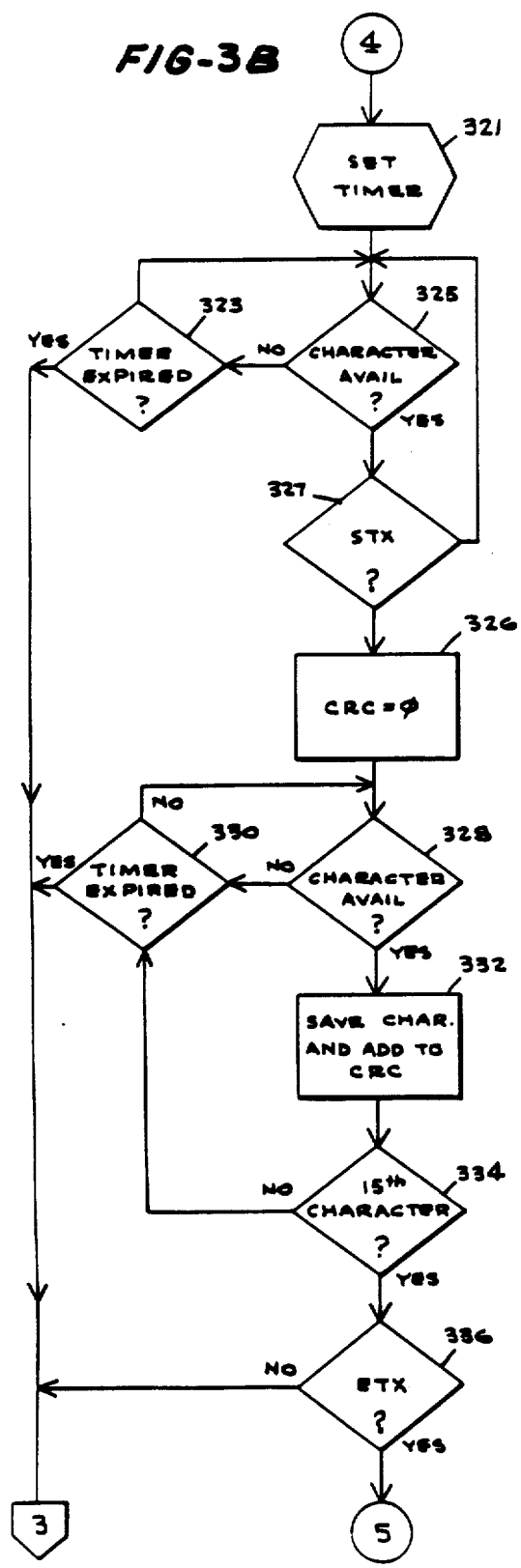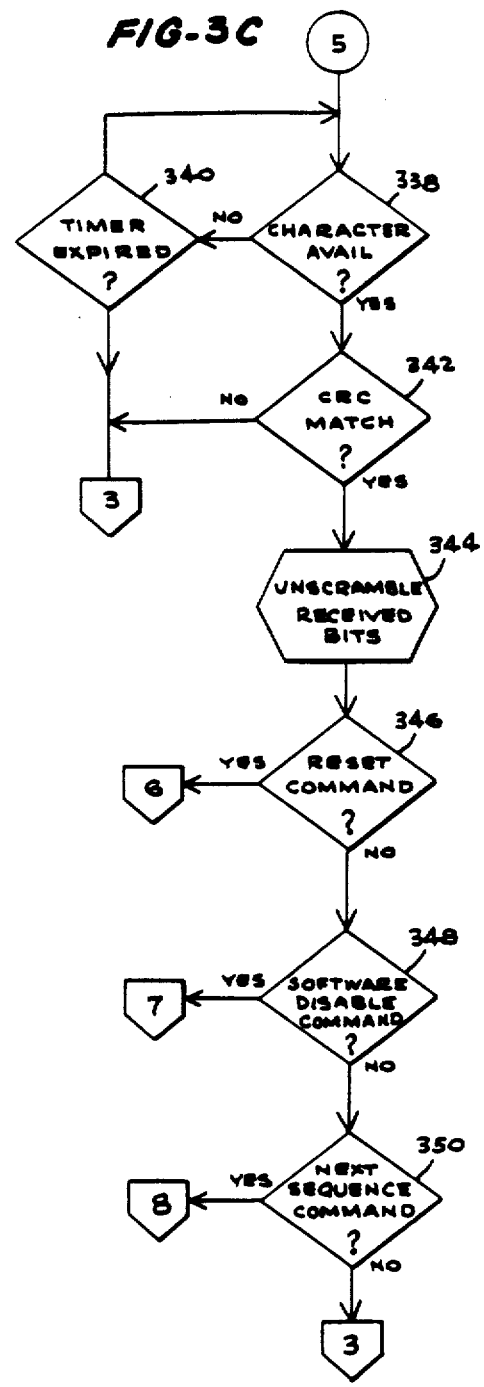
FIG-3B
FIG-3C

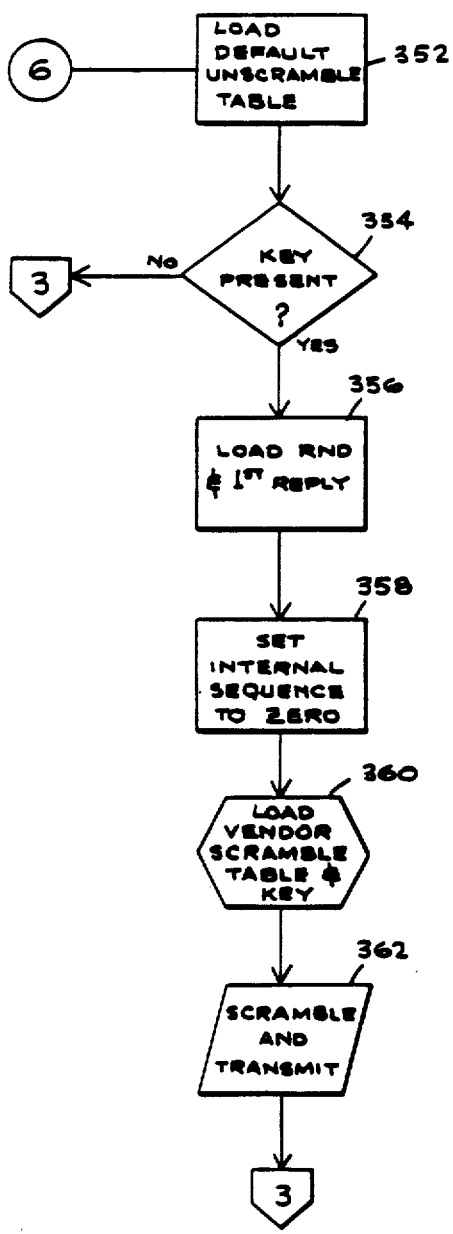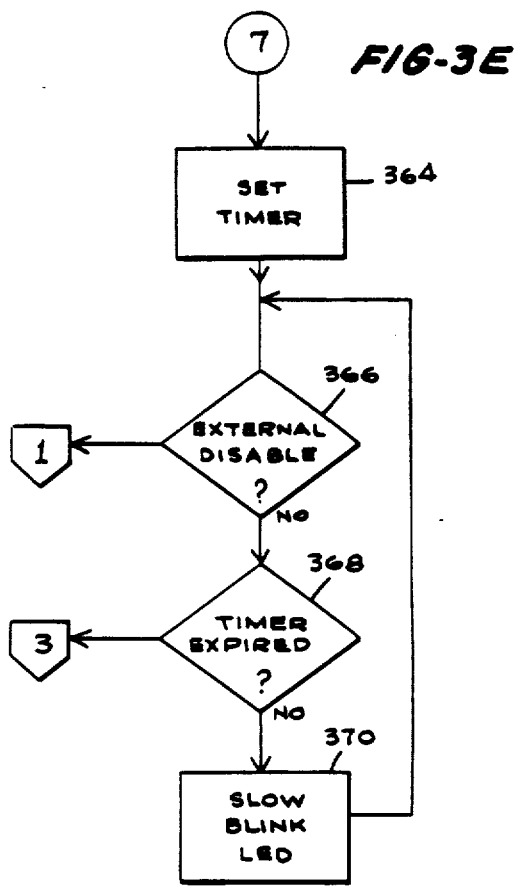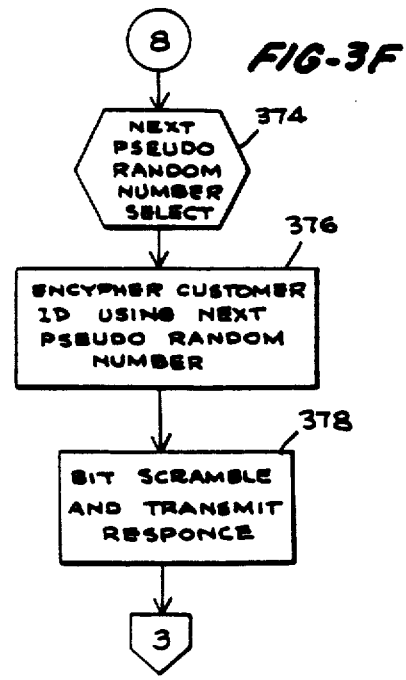

PROTECTED SOFTWARE ACCESS CONTROL APPARATUS AND METHOD

FIELD OF THE INVENTION

This invention relates to apparatus and methods for protecting software stored in reproducible media, whereby theft and, in particular, unauthorized reproduction and/or execution of the protected software is prevented.

DESCRIPTION OF THE PRIOR ART

In the prior art, authors and publishers of software programs for computers have had no acceptable means to prevent the copying of their programs by unauthorized individuals. The most common storage medium for these programs is the magnetic disk or its functional equivalents. Once the program is released to the user in this medium, it is a fairly simple task to have a computer read the software program and store it temporarily in the memory of the user's computer until such time as a blank disk can be placed in the computer and the computer can then release from its memory and record the program on the blank disk. Accordingly, every year the owners and publishers of these programs are being cheated of revenues due them for their product, by the user copying the program from a friend at no cost to the user. In this manner, individuals and businesses alike are acquiring hundreds or thousands of dollars worth of programs for the mere cost of the blank disk, which in most cases costs less than $10.

The relative explosion of the microcomputer market for use in the office and home has propelled the problem of software piracy to near epidemic proportions. Software development for microcomputers, for example, is expensive and time consuming. It is therefore important to the software developer that each authorized user pay for the programs used and not reproduce the programs to be used by others or at other sites. Software piracy is, in practice, difficult to prevent because it is generally easy for users to make multiple copies of the programs for unauthorized users, and easy for competitors to repackage and distribute valuable programs at a fraction of the cost to the original developer. The problem is aggravated by the existence of microcomputers which are becoming widespread.

Software manufacturers and publishers are losing millions of dollars every year in revenues due to the piracy of their programs, both by professionals as well as the hobbyist or casual users. Published 1982 statistics indicate that the average personal computer owner, also possesses at least five application programs. It is further believed that three application programs were purchased and the other two were pirated. The advent of program rentals and computer clubs will further compound this problem.

In the past, software manufacturers have tried to prevent the problem by writing unique codes or routines and embedding them in the storage mediums in a fashion that would disable the program in the event that the proper code was not present. Even the unsophisticated user can easily figure a way to get around or beat this technique, by copying the program as published, listing it out and looking for the unique codes, or passwords. Once he has found the password and can determine its function in the program, he can easily defeat it.

Access keys have been employed in the prior art to gain access to computers. In those key/computer security systems where only the software programs, and not the key itself, contain active encoding and decoding algorithms, the program information can be easily read and related to the corresponding key information contained in the software program. As a result, the key can be discerned and used subsequently to defeat the security system.

The most effective way to secure a program for its intended use, is believed to be by the use of a hardware key which works in conjunction with the software program. Some of the same problems exist with respect to defeating the security of such key mechanisms. Previously reported attempts to develop a hardware solution have suffered from a number of disadvantages.

First, the key information is contained only on the software storage medium itself in some implementations. Therefore, making a complete copy of the medium will result in the possibility of creating an unauthorized copy of the program since the key can be copied along with the protected program. When used normally, the approach further suffers by preventing the user from making legitimate back-up copies of the software program and renders it impossible to use the programs with large bulk storage devices.

Other techniques have been developed to contain the key information with a read only memory (ROM) which is interrogated by the software program prior to authorized execution. The defeat of this technique lies in the ability of the unauthorized user to record the interrogation of the ROM key and to use the key information including the password for the creation of duplicate keys. In particular, such ROM keys are coupled by exposed cables or ports to the computer, whereby access to the transmitted password between the ROM key and the computer is available to the unauthorized user. Typically, the transmission of data between the computer and the ROM key is accessed and then stored in a table, where the stored key data is analyzed to reveal the password.

Techniques have been developed to encrypt the key information including the password to prevent easy discovery of the password. If encryption is effected in a fixed manner, the password may be discovered by storing repeated transmissions between the ROM key and the computer in a table. The stored transmissions can be observed to discern the password to simulate the original key's function or to allow duplicate keys to be created. Even worse, these observed patterns can allow the relationship between the key information and the software program to be deduced so that an unauthorized universal master key can be created.

The prior art is replete with various methods and apparatus for encrypting data to be transmitted over lines, whereby even if the data is intercepted, stored within a table or memory and later analyzed, it would be difficult to decipher the encoding technique. It is evident that the degree of data or software security is dependent upon the nature of the encryption technique. Such techniques have been developed in a context of network systems comprising a computer and a plurality of remote terminals, whereby a user gains access to the computer through a remote terminal. The user's access request is transmitted over a communications link to the computer. In many applications, it is critical that only authorized users be capable of gaining access to the computer and/or have access to the data transmitted over the communications link.

Such data transmission security systems have been adapted to banking applications. Typically, a bank customer accesses a centrally disposed computer by entering his personal identification number (PIN) to be transmitted via the communications link to the central computer. If the customer's PIN has a match with a like PIN stored within a table of many PINs, a transaction is then authorized to be completed. To prevent unauthorized access to a customer's PIN or other data, the access request including the customer's PIN is encrypted to prevent recognition. It is well recognized in the art that it is virtually impossible to secure such communication links; as a result, the unauthorized user may gain access to the link and store the flow of data thereof for later analysis.

U.S. Pat. Nos. 4,268,715 and 4,281,215 of Atalla disclose a method of encrypting a user's PIN for transmission from the user station to a processing station. In particular, an encoding algorithm module is responsive to the output of a random number generator to provide a first encryption key. The encryption key is applied to an encryption module which provides an encrypted message indicative of the data to be secured. The encrypted message is then transmitted from the user station to the processing station, along with the random number and the key. A decryption module at the processing station decrypts the encrypted message using the transmitted key and random number. In this manner, the user's PIN is not transmitted over the communication links, where it would be available potentially to be read and discovered by an unauthorized user.

U.S. Pat. No. 4,310,720 of Check, Jr. discloses a computer accessing system, wherein a user enters his password into a portable access unit to be encrypted as an access code to be transmitted over a communications link to a computer. In particular, the access unit comprises a microprocessor programmed with a random number algorithm for generating a chain of nonrecurring, pseudorandom numbers from a group of seed numbers originally implanted in the microprocessor's memory. The pseudorandom numbers are used to encode the password to form the access code. The computer is programmed with a congruent random number generation algorithm and initial seed numbers compatible with those stored in the microprocessor of the access unit. The computer is initialized such that the initial access code generated by each access unit is stored in an available memory at the computer. Thus, the computer generates a chain of congruent random numbers, whereby a corresponding access code is provided to be compared with that access code transmitted from the remote access unit; if a match is made, access to the computer is granted.

U.S. Pat. No. 4,349,695 of Morgan et al. discloses a data access authentication system, wherein a user transmits a user identification from a remote terminal to an authenticator station, which controls access to a computer. In response to the user identification, the authenticator station generates a randomized character or character sequence, termed a key, that is transmitted to the access requester at the remote terminal. The key is also stored at the authenticator station to be used later. The remote terminal deciphers and uses the key to determine the starting point of a series of randomized digital characters generated by a key generator at the remote terminal. The random character is deciphered and retransmitted back to the authenticator station to be deciphered and, then, compared with the previously stored randomized character. If a match is made between the received and stored randomized characters, the user is authenticated to gain access to the computer at the authenticator station and to receive data therefrom.

U.S. Pat. No. 4,317,957 of Sendrow describes a system for authenticating users attempting to access a centrally disposed computer. The user's PIN is encrypted and transmitted to the centrally disposed computer, where it is decrypted and compared with stored PINs to potentially validate a transaction with the requesting user. A secret terminal master key is disposed both at each remote terminal and at the centrally disposed computer. In addition, multiple encryption and decryption techniques are retained at both the centrally disposed computer and at each remote terminal. The user enters his PIN in the form of an account number into the remote terminal which generates a working key unique to each transaction. The working key is in turn used to encrypt the transaction request message to be transmitted to the centrally disposed computer, which derives the working key to decipher the transaction request message. The deciphered message includes the user's PIN which is compared with a table of valid PINs stored within the memory of the centrally disposed computer. If a match is realized, a transaction access response is made to the requester at the remote terminal. The working key is a result of multiple encryptions in a predetermined way as stored within each remote terminal, these encryptions being dependent upon the master key. Corresponding multiple decryptions are stored at the centrally disposed computer that are initialized or synchronized with the multiple encryptions used at the remote terminal.

The security provided by a key may be defeated by inserting the key, or otherwise entering an access word, into the computer for executing the protected program. Typically, as noted above, the entered access word is compared with a retained access word as may be embedded in the software. Thereafter, the protection system provides authorization to proceed with the use and/or execution of the protected program. Typically after authorization, the authorized program is stored in an operating memory of the computer, where it is available to be executed. The unauthorized user may gain access to this program by removing the key and of using available diagnostic apparatus and/or available programs to take a "snap shot" of the operating memory and, thus, the allegedly protected program. In particular, the present content of the operating memory, including the allegedly protected program is read out and may be readily copied for unauthorized distribution.

A disadvantage of some present methods and apparatus for protecting programs resides in the fact that the protection method may prohibit the use of non-protected programs. For example, some program protection apparatus require execution authentication on each transaction between the executing computer and the user terminal upon which a request is entered. It is difficult to adapt such protection systems to operate with programs that do not require protection.

Further, it is often desired to use more than one software program that is protected by a key. In these applications, the computer operator must change physically the keys or enter new key information from his user terminal, when switching from one application program to the next. Supporting multiple keys for numerous software programs has presented both functional and logistic problems in that the logic control, as well as the physical space, is not provided in most computers that will permit accepting of multiple keys, much less the logic sequencing necessary to determine whether each of successive application programs is authorized by a corresponding key for execution by the computer.

SUMMARY OF THE INVENTION

It is therefore an object of this invention to provide a new and improved method and apparatus for prohibiting the functional use in terms of execution and/or copying of a software program.

It is a further object of this invention to provide a new and improved method and apparatus for protecting software, wherein the protected software is uniquely associated with a key that permits execution of the protected software on any computer provided that the corresponding key is coupled to the computer.

In accordance with these and other objects of this invention, there is provided a software access control system for controlling access to a protected application program. The software access control system comprises first and second processors, each having a terminal or port adapting its processor to be coupled with the other. The first processor is programmed to permit access to the protected application program and comprises a first memory storing the protected application program. The second processor comprises a second memory for storing a program identification manifestation assigned to the second processor. A data communication mechanism, illustratively in the form of a user terminal, is actuated to transmit an access request message including a requested program identification manifestation to the first processor, requesting permission to execute a requested application program. The first processor comprises means responsive to the receipt of the access request message for transmitting an authentication message to a carrier adapted to receive a plurality of the second processors. The carrier is responsive to the authentication message for accessing the second memories of the second processors to obtain their assigned program identification manifestations and includes means for determining whether there is a match between the requested program identification manifestation and their assigned program identification manifestations and, if there is a match, for generating and transmitting an access granting signal to the first processor.

In a further aspect of this invention, a second identification manifestation is assigned to an application program identifying a particular user to be granted access to the program. The first memory of the first processor stores a second or application identification manifestation corresponding to its application program. The second processor stores in its second memory a second identification manifestation assigned to the second processor and, in response to an authentication message, transmits the assigned second identification manifestation to said first processor, whereby said first processor compares the assigned second identification manifestation with its second identification manifestation and, if there is a match, grants access to use the requested application program.

In an illustrative embodiment of this invention, there is a two-step process of granting access to a protected application program. First, the program identification manifestation, as entered on the user terminal, is compared with the first or program identification manifestation as assigned to the second processor coupled to the first processor. If there is a match, a further step is taken. The further step transmits a further authentication message from the first processor to the second processor. In response, the second processor transmits the assigned second or customer identification manifestation to the first processor, wherein a comparison is made between the retained second identification manifestation and the assigned second identification manifestation. If there is a match, access to use and to execute the application program is granted.

BRIEF DESCRIPTION OF THE DRAWINGS

A detailed description of a preferred embodiment of this invention is made in conjunction with the following drawings in which like references are used in the different figures for illustrating the same elements:

FIGS. 1A, 1B, and 1C are respectively a perspective illustration of the elements of a software security system in accordance with the teachings of this invention, a functional block diagram of the software security system of this invention and a functional block diagram particularly showing the computer architecture of the responsive key carrier and its processor keys;

FIGS. 2A and 2B comprise a high level flow diagram of the sequence of steps executed by the application program executing computer and the microprocessor key for permitting use of an application program by the application executing computer, as shown in FIGS. 1A and 1B;

FIGS. 3A to 3F comprise a low level flow diagram of the program stored within the memory of the microprocessor responsive key carrier, as shown in FIGS. 1A, 1B and 1C.

DESCRIPTION OF THE PREFERRED EMBODIMENT

Figure 1A:
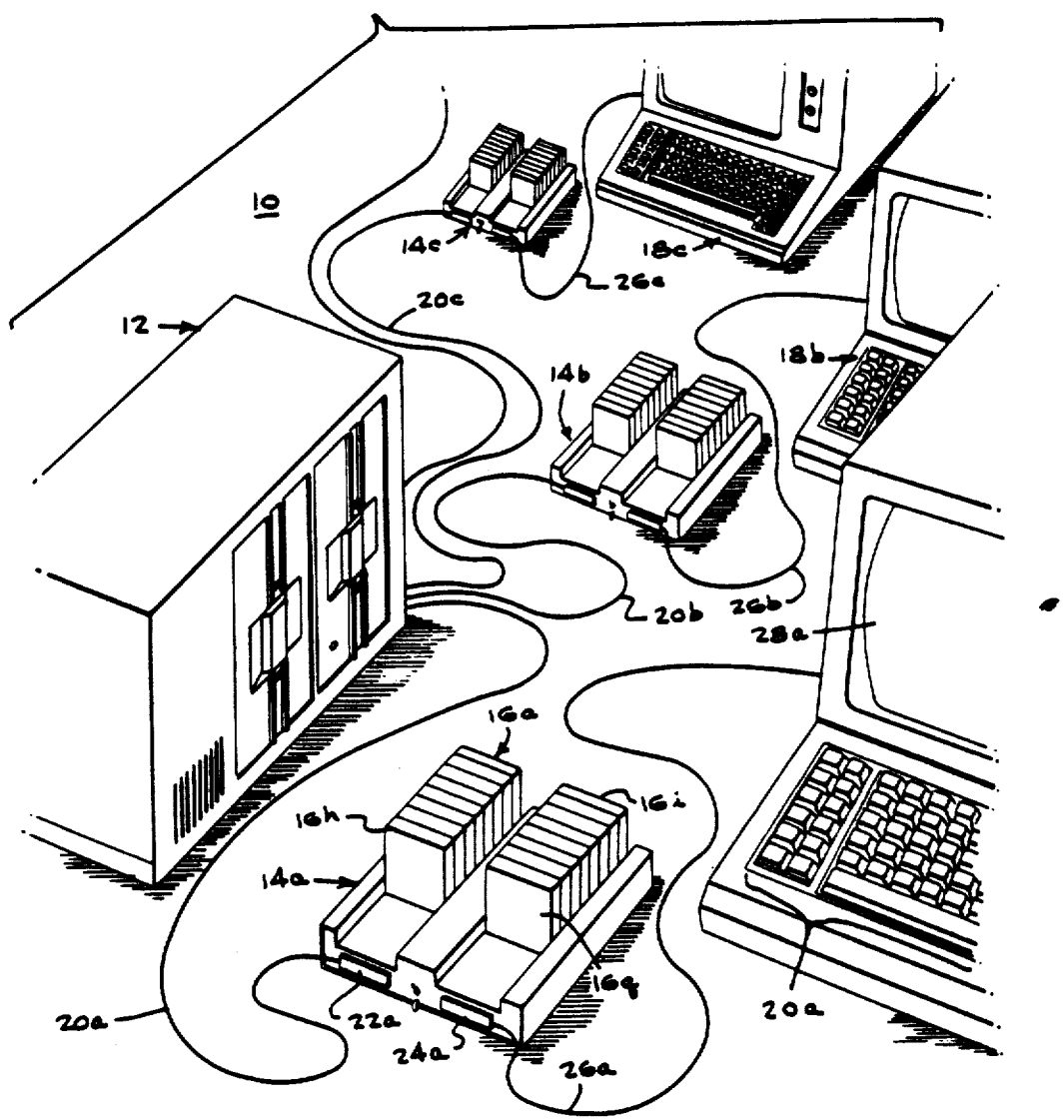

Referring now to the drawings and, in particular, to FIGS. 1A and 1B, there is shown a software security system or apparatus in accordance with the teachings of this invention. The software security apparatus of this invention is designed to protect the unauthorized use, in terms of execution and/or copying, of one or a plurality of application programs 40a, 40b and 40c in an application program executing computer (APEC) 12. As shown in FIG. 1, such application programs 40 may be typically stored within an external memory 36 coupled by a suitable bus to an internal memory 32 for storing the operating system software that serves to call and to control the execution of the application programs 40. The APEC 12 includes a CPU 30 that controls the execution of one or more of the application programs 40 under the control of the operating system software as stored in the memory 32.

Typically in operation, a potential user, whether authorized or not, will request the execution of one or more of the application programs, inserting his request on the keys 20 of a program user's terminal 18. The purpose of this invention is to determine whether the user is authorized or not and, if not, to prevent the effective use of the protected application program. Initially, a path is provided between the program user's terminal 18 and the APEC 12 via a cable 26a, a closed or activated carrier bypass switch 52 (disposed within a responsive key carrier 14), a cable 20, a communications port 48a and a bus 46a to the CPU 30 of the APEC 12. The response of the APEC 12 to the user's application program execute request will be explained below with respect to FIGS. 2A and 2B. The requested particular application program 40 is transferred from the external memory 36, such as a disk-type memory, and placed within an application program memory 44. It is understood that the operating system software memory 32 and the application program memory 44 may comprise but a single memory having specified addresses, as is well recognized in the art.

Significantly, the software security system and method of this invention are adapted to be used with any of a large number of computers and, in particular, microprocessors to provide security to application programs 40 against unauthorized use. The software security apparatus of this invention may be adapted to any computer and/or microprocessor that has an RS 232 serial, parallel or similar type of data communications port, such a port being illustrated as any one of communication ports 48a, 48b and 48c in FIG. 1B.

A significant aspect of this invention resides in the use of a responsive key carrier 14 that is capable of receiving a plurality of microprocessor implementing keys 16a to 16q, as illustratively shown in FIG. 1A. As indicated in FIGS. 1B and 1C, each of the microprocessor keys 16a is coupled by a responsive key carrier communications bus 54 to a responsive key carrier microprocessor 50. The responsive key carrier microprocessor 50 is coupled by a bus 56 to the carrier bypass switch 52, whereby the user's application program execute request may be transmitted from the program user terminal 18a to the APEC 12. As will become evident from the later explanation, the carrier bypass switch 52 is opened after transmission of the user's application program execute request to prevent the data transmissions involved in the authorizing transaction between the APEC 12 and the responsive key carrier 14 from being displayed or printed on the user's peripheral device 18a which would produce unneeded and unattractive interference with the operation of such device. The bypass switch 52 will again be closed to restore normal communication between the APEC 12 and the peripheral device 18a immediately upon the conclusion of an authorizing transaction whether or not that transaction was successful. Further, the responsive key carrier processor 50 is associated by a bus 74 with a memory 68 for storing programs that will permit the encryption and transmission of the encrypted data between a selected one of the microprocessor keys 16 and the APEC 12, as well as to control the operation of the carrier bypass switch 52. As will be explained, the responsive key carrier microprocessor 50 is initialized to obtain a manifestation indicative of the protected application programs 40 associated with each of the microprocessor keys 16 that is connected to its responsive key carrier communications bus 54. The responsive key carrier microprocessor 50 functions in response to the user's application program request to check whether the microprocessor key 16, uniquely corresponding to the requested application program, is inserted and connected to the bus 54. If so, the responsive key carrier microprocessor 50 generates an enable signal upon one of its lines 17 to be applied to the corresponding one of the key microprocessors 16.

As shown in FIG. 1B, each application program 40c includes an applique program 42, which is added to the application program 40 to be protected and uniquely interrelates to a corresponding microprocessor key 16, as will be explained in detail. The applique program 42 is incorporated in the application program 40 to be initially addressed when the user enters his application program execute request upon the user's terminal 18. In particular, a customer identification 43 is embedded within the applique program 42 and, if that customer identification matches with a customer identification as stored within the storage location 62 of the PROM 60 associated with the microprocessor key 16, an enable signal is generated by the applique program 42 which is passed to the application program 40 to inform it that it may continue normal execution. If no match is realized, indicating the potential user does not have a corresponding microprocessor key 16 and, therefore, is unauthorized, the applique program 42 will inform its application program 40 that execution is to be modified or discontinued.

The APEC 12 has a number of other communication ports 48b and 48c, in addition to the communications port 48a which are coupled respectively by buses 46b and 46c to the CPU 30. Thus, the responsive key carrier 14a is coupled to the communications port 48a to control the accessing or requesting of a particular application program without interfering with the normal operations of the computer with respect to a printer 19 or to another user terminal 18x, as are coupled respectively to the communication ports 48b and 48c. The responsive key carrier 14 may be connected to any convenient port on the APEC 12 including the port 48a to which the user terminal 18a is normally connected. In particular, the coupling of the responsive key carrier 14 and its microprocessor keys 16 of this invention does not diminish the use of the APEC 12 with other peripheral devices. Thus, the responsive key carrier 14 may be connected to any communications port 48 or the APEC 12 which may be convenient, including but not limited to a port 48 used to support the user's terminal 18a which is used to request the execution of a particular protected program 40. The applique program 42 will search each port 48 to find out to which port 48 the responsive key carrier 14 has been connected. The bypass switch 52 on the responsive key carrier 14 will prevent authorizing transaction messages from interfering with the function of any peripheral device 18a during the time that the authorizing transaction is taking place.

Referring now to FIGS. 2A and 2B, there is shown a system's, high level flow diagram describing the method by which the applique program 42 is interrelated to a corresponding microprocessor key 16 to determine whether the potential user is authorized or not to execute a protected program 40 and, in particular, to determine whether the customer identification embedded in the storage location 43 of the applique program 42 (see FIG. 1B) matches the customer identification stored in the PROM 60 of the key microprocessor 16a (see FIG. 1C). After entering the system's program 200 through a start step 202, the potential program user enters his or her application program execute request upon the keyboard 20 of the user terminal 18a, as indicated in step 204. Initially, the carrier bypass switch 52 is enabled to permit transmission of the application program execute request signal via the cable 26a, the enabled carrier bypass switch 50, the cable 20a, the communications port 48a, and the bus 46a to the CPU 30 of the APEC 12. In response, the CPU 30 in step 204 searches its external memory 36 for the presence of the requested application program 40. If present, the requested application program 40 is transferred to the application program memory 44, for further examination. Next, step 206 determines whether the requested application program 40 is protected by the addition of an applique program 42 in accordance with the teachings of this invention. It is a feature of the invention that nonprotected programs can also be stored and executed by the APEC 12, while allowing particular programs that have been adapted in accordance with teachings of this invention by the addition of the applique program 42 to be protected on the APEC 12. If step 206 determines that the requested program is not protected, the program 200 proceeds to step 234, as shown in FIG. 2B, to permit execution of the requested program. Alternatively, if the requested application program is protected as by the addition of the applique program 42, the program moves to step 208, which searches for the presence of a responsive key carrier 14 on one of the communication ports 48 of the APEC 12. The responsive key carrier 14 may be connected to a port 48 other than that port to which the user terminal 18a is attached. If the requested application program 40 is protected and no responsive key carrier 14 is coupled, the program 200 moves to step 236, that recognizes the absence of the responsive key carrier 42. Thereafter, step 238 causes the applique program 42 to disable or modify the application program's ability to be executed.

If on the other hand, step 208 determines that a responsive key carrier 14 is coupled to one of the ports 48 of the APEC 12, the applique program 42 generates and transmits an acknowledgement signal to the coupled responsive key carrier 14a and, in particular, to its responsive key carrier microprocessor 50, whereby a "handshaking" therewith is completed. Next, the applique program 42 sends to the responsive key carrier 14a a plurality of signals, namely a truly randomly selected seed number and a program identification specifying the requested application program 40, as by the steps 212 and 214, respectively.

In one embodiment of this invention, a further degree of encryption is achieved by using a selected one of a plurality of encryption algorithms, each algorithm identified by an algorithm selection number. In such an embodiment, each of the applique programs 42 and the memory 60 associated with each of the key microprocessors 16 contains a like family of encryption algorithms. One of the encryption algorithms is selected in accordance with the algorithm selection number and transmitted to the microprocessor key 16, whereby the customer identification as stored in the location 43 of the applique program 42 and also within the memory location 62 of the PROM 60 associated with the microprocessor key 16 may be encrypted in such a complex manner as to render virtually impossible the recognition of the customer identification as transmitted from the key microprocessor 16 over the cable 20 to the APEC 12.

In an illustrative embodiment of this invention, the encryption algorithm or the family of encryption algorithms is based upon the Data Encryption Standard (DES) algorithm as promulgated by the National Bureau of Standards. The specification of the DES is described in the government publication entitled FIPS PUB. 46 (Jan. 15, 1977). As is well-known in the art, the DES algorithm is implemented by a program to encrypt the customer identification illustratively taking the form of a sequence of 64 bits of data. The DES algorithm illustratively scrambles the stream of data comprising the customer identification by reiterative multiplication of its sequence of bits into an unrecognizable sequence using a randomly selected 56-bit number known in the art as an "encryption key". An additional 8 bits of data are included in the encryption key for parity checking, thus, providing the encryption key as a 64-bit long number. More generally, the "encryption key" of this invention is used as a pattern for shifting the bits of the customer identification to produce a new sequence of 64 bits comprising the encrypted customer identification. The "encryption key" is used also in the decrypting process to recover the original sequence of bits comprising the customer identification.

To further enhance the encryption process, a long stream of pseudorandom numbers is generated and a selected pseudorandom number of the stream is used as the "encryption key". If such a stream of pseudorandom numbers were observed over an extremely long period of time, it would be observed that the data stream is cyclic in that the sequence of numbers eventually repeats itself. As will be explained below, the occurrence of a transaction between a given application program 40 and a processor key 16 triggers the selection of the next pseudorandom number in the stream as the key to be used in the encrypting and decrypting process used in the next such transaction. In an illustrative embodiment of this invention, the generation of the next character of a message may trigger the selection of the next pseudorandom number to be used in the encryption/decryption process. Further, if the pseudorandom stream of numbers were to be initiated at the same starting point, a like sequence of numbers would always be generated. Thus, this invention employs a truly randomly generated seed to determine the starting points of the streams of pseudorandom numbers. Thus, the encryption imparted to the customer identification is both extremely complex and truly random, making it virtually impossible to decode the encrypted customer identification by simple or even computer aided examination. First, the possible choices of keys is vast and is varied from transaction to transaction to vary the encryption process. Secondly, the starting point or seed within the stream of pseudorandom numbers is varied from set of transactions to set of transactions or from character to character. Thirdly, one of a plurality of different encryption algorithms may be used to encrypt the customer identification. Thus, it is virtually impossible to discern the customer identification by tapping the cables 20 or the communications ports 48.

Further, the encryption method of this invention prevents the use of an authorized processor key 16 to first generate a verification or authorization signal and, secondly, to remove the key 16 before making a copy of the initially authorized application program 40 in the application program memory 44. As will be explained in detail below, the applique program 42, as stored within the APEC 12, and the software retained within the microprocessor key 16 each include its own pseudorandom generator that generates in a coordinated or congruent manner a stream of pseudorandom numbers. As will become evident, either of the applique program 42 or the processor key software may randomly generate the seed that is used in both pseudorandom generators to initiate the stream of random numbers at the same point. Upon the occurrence of the next transaction (or character transmission) between the APEC 12 and the processor key 16, the next pseudorandom number within the sequence is selected as the "encryption key" for the encryption process for that transaction. In particular, the application program 40 includes periodically generated instructions calling the applique program 42, whereby an initiate authentication message is generated and transmitted by the APEC 12 executing the applique program 42 to the corresponding processor key 16. If the processor key 16 has now been removed, there is no means for providing a new return message to the APEC 12 with the newly encrypted customer identification. As a result, the applique program 42 will see no return message, much less an encrypted customer identification in accordance with the new pseudorandom number or key. Thus, an unauthorized user is unable to continue the execution of the application program 40. If the unauthorized user is able to obtain a "snap shot" of the application program within the memory 44, the unauthorized user does not have access to the next pseudorandom number and is, therefore, unable to transmit a response to the APEC 12 in terms of the newly encrypted customer identification that would facilitate the further execution and/or copying of the "snap shot" copy of the application program 40.

As shown in FIG. 2B, the overall program continues in step 218, wherein the transmitted program identification, the randomly generated seed and algorithm selection number are received by the responsive key carrier microprocessor 50 and stored in its memory 68. Thereafter, the responsive key carrier microprocessor 50 executing the software stored in its memory 68 examines, in step 220, each of the microprocessor keys 16 as coupled to its key carrier communications bus 54. In particular, the responsive key carrier microprocessor 50 examines the received program identification to search for the corresponding one of the microprocessor keys 16, it being recognized that each microprocessor key 16 is associated with its own application program 40. Next, step 222 determines whether the microprocessor key 16 corresponding to the transmitted application program identification is present and, if not, the key carrier 14 fails to respond thereby causing return to step 238 to disable program execution. On the other hand, if the microprocessor key 16 corresponding to the program identification is present, the responsive key carrier microprocessor 50 transmits, in step 224, the randomly generated seed and algorithm selection numbers to the corresponding one of the microprocessor keys 16. Thereafter, the corresponding microprocessor key 16 calls one of the family of encryption algorithms in accordance with the algorithm selection number and performs the first of a sequence of pseudorandom encryptions of the customer identification using the selected algorithm and transmitted random seed. Thereafter, the microprocessor key 16 in step 228 encrypts the customer identification and transmits the first version of the encrypted customer identification via the responsive key carrier microprocessor 50, the cable 20a, the communications port 48a and the cable 46a to the CPU 30 of the APEC 12. Thereafter, the APEC 12 performs the first of a pseudorandom sequence of decryptions of the transmitted customer identification using the retained truly randomly generated algorithm selection and random seed numbers, it being understood that the algorithm selection and random seed numbers were stored, in steps 212 and 216, for later use by the APEC 12. Each pseudorandom decryption or encryption corresponds to the occurrence of the next transaction between the APEC 12 and the processor key 16 corresponding to the selection of the next pseudorandom number or key to be used in the encryption/decryption process. Next, step 232 compares the decrypted customer identification with that customer identification stored within the memory 32 and if a match is recognized, the program moves to step 234 to permit execution of the requested application program. If not, the program moves to step 238 to disable or modify program execution.

As indicated above, any message as would appear upon the readily accessible cables 20a or the communications port 48a is encrypted so as to render substantially impossible the discernment of the customer's identification. It is recognized that if the customer identification could be discerned, that techniques are available to apply that recognized customer identification to the APEC 12 to gain access to the protected application program 40, whereby it may be executed and/or copied.

In addition, the mechanical structure of the microprocessor key 16 is designed to prevent discovering of the customer identification and, in particular, to prevent access to the PROM 60 to obtain a direct read out of the family of encrypting algorithms or the nonencrypted customer identification. In particular, each of the microprocessor keys 16 is embedded in a hard, brittle encasing material such as a ceramic as manufactured by Intel Corp. under their model number 8748, and the conductor leading to the direct read enable pin of its associated PROM 60 is destroyed or eliminated, if an unauthorized user attempts to disassemble the microprocessor key 16 and gain access to its PROM 60. Such ceramic material is made by many companies and is typically used to encase such self-contained, integrated circuit memory and microprocessor devices. For example, the PROM 60 and its associated microprocessor key 16, as shown in FIG. 1C, could take the form of that self-contained processor and memory as manufactured by Intel Corp. under their designation model no. 8748; in such an illustrative embodiment, the read data enable pin is destroyed or eliminated during disassembly.

As shown in FIGS. 2A and 2B, the APEC 12 executes an applique program 42 of the requested application program 40 to generate an initial message which is bit-scrambled in accordance with a fixed, predefined transformation scheme and then transmitted over an accessible communications port 48a and cable 20a to the responsive key carrier 14a and, in particular, to one of its microprocessor keys 16. The bit-scrambled data comprises the algorithm selection number identifying the selected one of the family of encryption algorithms to be used to encrypt the data contained within a return message transmitted from the responsive key carrier 14 to the APEC 12. After the transmission of the initial message, subsequent messages from the APEC 12 to the responsive key carrier 14 with this data is bit-scrambled in accordance with a bit-scrambling transformation variably set by the selected encryption algorithm. In addition, the transmitted bit-scrambled message includes a random seed that identifies that point within the stream of pseudorandom numbers at which the encryption process is to begin. Further, the program identification is also sent, whereby the responsive key carrier microprocessor 50 may enable one of the microprocessor keys 16 by applying via a corresponding conduit 17 a signal enable thereto. The key carrier microprocessor 50 unscrambles the received bit-scrambled message and passes the unscrambled random seed and algorithm selection numbers to the enabled processor key 16. The family of encryption/decryption algorithms is contained within the applique program 42 associated with the selected application program 40, as well as the software contained within each of the PROMs 60. Thus, the microprocessor key 16 is able to use the transmitted seed and that encryption algorithm as selected by the algorithm selection number to encrypt the return message containing the customer identification also stored within the self-contained PROM 60. Thus, the customer identification is never directly observable by any simple means in nonencrypted form. The APEC 12 decrypts the encrypted customer identification of the return message in accordance with the selected algorithm and seed as retained in a memory of the APEC 12. If there is a match between the decrypted customer identification and that customer identification as implanted within the location 43 of the applique program 42, corresponding to the called application program, the APEC 12 is permitted to execute or to continue to execute the requested application program; otherwise, the APEC 12 is disabled from otherwise using the requested application program 40 or is allowed to execute it only in a modified or limited manner.

From the above, it is seen that various steps of the method illustrated in FIGS. 2A and 2B are performed by each of the applique programs 42 as executed by the APEC 12, as well as the software stored and executed by the responsive key carrier microprocessor 50 and one of the microprocessor keys 16. Any attempt to discern the customer identification or the nature of the encryption/decryption algorithm used to protect a particular application program by examination or observation of the applique binary object code embedded in the protected application program or the self-contained memory of the processor key or by examination of the transactions on the cables between the APEC and the key will prove extremely difficult and of little value if accomplished because each type of protected program uses different variations for encryption techniques for its family of selectable algorithms in the applique and key processor software, as well as embedding the applique program in various types of application programs in different ways.

Referring now to FIGS. 3A to 3F, there is shown a relatively low level flow diagram of a further embodiment of the programs as stored within various of the self-contained PROM 60 and executed by the responsive key carrier microprocessor 50, the PROM 60 and executed by the key microprocessor 16a, and the applique program 42 and executed by the APEC 12. The flow diagram illustrated in FIG. 3A comprises a sequence of steps as carried out by each of the applique program 42, the software stored and executed by the key carrier 14 and the software stored and executed by the microprocessor key 16. Referring now to FIG. 3A, the illustrated program is entered through the start step 302 to step 304, which initializes various housekeeping parameters such as which input/output ports of the responsive key carrier microprocessor 50 are energized and the data rate at which the microprocessor 50 is operated. Thereafter, step 306 accesses each of the microprocessor keys 16 as coupled to the responsive key carrier communications bus 54 and loads the program identification of each of the coupled microprocessor keys 16 into designated memory locations. Thereafter, step 308 determines whether there has been an external disable effected by throwing an on/off switch 15 mounted externally of the responsive key carrier 14 to determine whether the on/off switch 15 is thrown off. The computer user has the option of manually disabling the responsive key carrier 14 to permit communication between the APEC 12 and a peripheral device 18 without the possibility of interference with the operation of the peripheral device 18 by the messages transmitted between the APEC 12 and the responsive key carrier 14. Such interference would occur when the responsive key carrier 14 is coupled to the same communications port 48 to which the peripheral device 18 is connected. If the switch is off, the program moves to step 310, whereby a light emitting diode (LED) is blinked slowly before returning to step 304. However, if step 308 indicates that the switch 15 is not thrown to its on state to disable the responsive key carrier 14 and, thereby, to continually dispose the carrier bypass switch 52 to its conductive state, the program moves to step 310, which examines the input port 72 of the responsive key carrier microprocessor 50 to determine the presence of the first character of a message having 15 characters, illustratively in the ASCII format, as transmitted from the APEC 12. If no character is present, the program moves to step 320 which increments a random number (RND) counter as stored within a designated location of the memory 68. The input port 72 is examined periodically and if no character is present, the count in the RND counter is incremented by "1"; this count which may assume a value of 0 to $2^{16}$ is, in one illustrative embodiment of this invention, the means for generating randomly a seed to be used in the encryption process. Significantly, the count forming the random seed is truly random, as opposed to a pseudorandom number, in that the count is dependent upon a random event in time, i.e., the receipt of a character from the APEC 12. Alternatively, the means for generating the random seed may be formed within the applique program 42. In either case, the randomly generated seed will be used both by the applique program 42 to decrypt the return message received from the processor key 16 and by the key processor 16 to encrypt the return message transmitted therefrom to the APEC 12.

The bypass switch 52 remains closed to permit communication between the APEC 12 and any peripheral device, e.g., the user terminal 18a, which is connected to the communications port 48a. In this illustrative embodiment of this invention, the applique program 42 transmits a special start of message signals in the form of three null characters.

As it is well-known in the art, null characters are typically used in communicating with peripheral devices such as CRTs and printers to provide information other than alphanumeric data to avoid interfering with the normal operation of the peripheral devices. Typically, a null character may be represented in the ASCII format by a "0000000". Thus, the program searches each character to determine whether it is a null character, thus, possibly indicating the first of three null characters and the beginning of message signal. Thus, step 310 looks for the receipt of any character upon its communications port 48a and, if present, step 312 determines whether that character is a null character. If a null character is not received, the program moves to step 322, wherein a null character counter as formed within an addressable location of the memory 68 is reset to zero, before returning to step 308 to look for the next message. However, if the character appearing at the input port 72 of the responsive key carrier microprocessor 50 is a null character, the null character counter is incremented by one in step 314. Next, step 316 determines whether three null characters have been received by the responsive key carrier microprocessor 50 to indicate uniquely that a start of message signal has been transmitted by the applique program 42. The receipt of three null signals indicates to the responsive key carrier 14 that the following message is not data of the type that would be normally transmitted by the APEC 12 to a peripheral device, but rather an initial message to establish dialog between the applique program 42 and the responsive key carrier 14 and, in particular, one of its microprocessor keys 16. If no character is received, the program returns to step 320 which increments the RND counter by one and, if the received character is not a null character, step 322 resets the null counter to zero. However, if three concurrent null characters have been received from the applique program 42, the program moves to step 318 to disable or open the carrier bypass switch 52 and to establish a private dialog between the responsive key carrier microprocessor 50 and the APEC 12 by disconnecting for a short time or the balance of the authorizing transaction (whichever comes first), any peripheral device which may be connected to the other side of the bypass switch 52.

The program continues, as shown in FIG. 3B, which illustrates a routine stored and executed within the responsive key carrier 14. Initially, step 321 initiates a Fail/Safe (F/S) timer register within the memory 60, whereby the time period that the carrier bypass switch 52 is disabled is limited. After the F/S timer has timed out, the carrier bypass switch 52 will again be closed to permit communication between the user's peripheral device 18a and the APEC 12. Thereafter, step 325 examines the input port 72 of the responsive key carrier microprocessor 50 for the presence of any transmitted character from the APEC 12, potentially the next character of the message following a sequence of three null signals. If no character is received, the program moves to step 323 to determine whether the F/S timer has timed out and, if not, the program will loop between steps 325 and 323 until either another character of the message is received or the F/S timer has timed out. If step 323 determines that the F/S timer has timed out, the program exits through point 3 to return to the flow diagram as shown in FIG. 3A and, in particular, to step 324, wherein the carrier bypass switch 52 is enabled to permit communications between the peripheral device and the APEC 12. If the F/S timer times out, the null character counter is then reset to zero, before looking for the next message as may be generated by an applique program 42.

On the other hand, if step 325 determines that the next character of the message has been received from the APEC 12, the program moves to step 327, which determines whether the received character is a start of transmission character STX as would be generated by the applique program 42 of the requested application program 40. If not, the program loops through steps 325, 323 and 327 until the F/S timer has timed out, as indicated by step 323, or the character STX is received from the applique program 42. Upon receipt of the character STX, step 326 sets to zero a cyclic redundancy check (CRC) register formed within the memory 68. The CRC register is a register storing a value representing the binary sum of the message characters. This binary sum is used as a redundancy check to determine that each of the message characters transmitted by the applique program 42 subsequent to the start of transmission character STX is valid. The applique program 42 maintains a similar CRC register and after the transmission of the message, the binary value from the CRC register of the applique program 42 is transmitted to be compared with the binary value accumulated within the CRC register of the responsive key carrier microprocessor 50 and, if a match is obtained, a manifestation is provided that the previously transmitted set of characters has been accurately transmitted.

Next, step 328 determines whether the next character sent by the applique program 42 has been received and, if not, step 330 determines whether the F/S timer has expired; if expired, the program returns to step 324 as shown in FIG. 3A and explained above. If the next character of the message has been received, step 332 places the character in an input message buffer as formed within a selected location of the memory 68, before determining whether the 15th and last character of the input message has been received in step 334. It is understood that the message transmitted from the applique program 42 contains 15 characters when complete. If 15 characters have not been received as determined by step 334, step 330 determines whether the F/S timer has expired and, if not, the program returns to step 328 to look for the next character of the message from the applique program 42. After determining that the 15th character of the message has been received, step 336 looks for an end of transmission character ETX; if not received, the program returns to step 324 as shown in FIG. 3A and explained above.

If the end of transmission character ETX has been received, the program moves to that portion of the flow diagram illustrated in FIG. 3C to receive and evaluate that character indicative of the binary value accumulated in the CRC register maintained by the applique program 42. The routine, illustrated in FIG. 3C, is stored with and executed by the responsive key carrier 14. An entry is made through point 5 to step 338 to determine whether the next character indicative of the CRC value has been received, if not, step 340 determines whether the F/S timer has expired and, if not, the program loops through steps 340 and 338 to await the arrival of the next character. If the F/S timer has expired, the program returns to step 324 as shown in FIG. 3A and explained above. If the next character is received as detected by step 338, step 342 compares the binary value of that character with the binary value accumulated within the CRC register to determine whether the binary sum of the preceding 15 characters as transmitted from the applique program CRC register and that CRC register maintained within the responsive key carrier microprocessor 50 match to determine the accuracy of the transmission and reception of the message. If the binary values of the CRC signals fail to match, the program returns to step 324 to look for the transmission of the next message from the applique program 42. However, if step 342 determines that the previously received message has been accurately transmitted, step 344 unscrambles the bits of the received message, noting that the applique program 42 bit-scrambles its message in a fixed transformation. Thereafter, steps 346, 348 and 350 determine whether the transmitted message is respectively a reset command, a software disable command, or a next sequence command. If none of the three valid commands or messages are received, the program returns to step 324 and that portion of the program illustrated in FIG. 3A to await the reception of the next message from the applique program 42.

The portion of the program 300 illustrated in FIGS. 3A, 3B and 3C functions to sense the receipt of characters and, in particular, a message as formulated by 15 characters, as described above. In an illustrative embodiment of this invention, there are three valid messages, namely a reset command, a software disable command, and a next sequence command. The reset command is that first initiate authentication message formulated by the applique program 42 of the requested application program 40. The reset command is formulated by the APEC 12 responding to the user's access request message for a particular application program 40 entered upon the terminal 18a by calling and executing the corresponding applique program 42 to generate and transmit the reset command via the responsive key carrier 14 to one of the plurality of processor keys 16 corresponding to the requested application program 40. The reset command includes a first string of data encoded in accordance with a corresponding application program 40. If coupled to the key carrier 14, the microprocessor key 16 corresponding to the requested application program 40 responds to the first string of data to transmit and encrypt a return message to the APEC 12.

The method and apparatus of this invention contemplates that there will be a sequence of initiate authentication messages. The reset command is the first initiate authentication message followed by a series of subsequent initiate authentication messages termed in the program 300 as next sequence commands. To provide added software security, each of the application programs 40 is programmed with instructions calling the applique program 42 to generate subsequent initiate authentication messages, i.e., next sequence commands. The placement and sequencing of the application call instructions is not critical from the purposes or operation of this invention, but is rather determined by the nature and sequence of the steps of a particular application program. Of course, the degree of security provided by this method and apparatus is enhanced by increasing the number of times that an applique program 42 is called to generate subsequent next sequence commands. Each of the next sequence commands comprises a second string of data representing an encrypted version of a customer identification indicative of a customer authorized to use a particular application program 40.

The third valid message is the software disable command that is used to disable communication between a processor key 16 and the APEC 12 and to close the bypass switch 52 to permit, for a set period of time, communication between the APEC 12 and that peripheral device 18 connected thereto via the closed bypass switch 52. For example, the application program 40 may call for the display of certain data upon the terminal 18a. A software disable command would be generated when it is desired to avoid any confusion between the data transmitted to the peripheral device 18 and a possible response that the processor key 16 may give to that data.

If a reset command is identified by step 346, the program moves to that portion of the flow diagram illustrated in FIG. 3D entering through point 6 to commence a key acknowledge present subroutine as set out in steps 352 to 362. The key acknowledge present subroutines evaluates and responds to the initial authentication request, i.e., the reset command, as generated by the applique program 42 of the user requested application program 40. The applique program 42 bit-scrambles the reset command in a predetermined transformation that is also known to the key processor 16. First, step 352 loads the reset command into a default unscramble (DU) table, wherein the reset command is unscrambled in the predetermined transformation. The reset command message includes the first data string with its program identification of the requested application program 40. The reset command is the first in the sequence of communications between the applique program 42 and the microprocessor key 16. The data unscrambled in step 352 including the program identification triggers the transmission of a return message back to the APEC 12. As will be explained, subsequent messages in the form of next sequence commands are also bit-scrambled; in an illustrative embodiment, the subsequent bit-scrambles are carried out with a different bit transformation as determined by the selected encryption algorithm.

Next, step 354 determines whether the reset command contains a program identification corresponding to one of the microprocessor keys 16 that is coupled to the responsive key carrier communications bus 54. In particular, the table into which all of the program identifications corresponding to those microprocessor keys 16 that are connected to the responsive key carrier communications bus 54, is examined to determine whether a match exists between the transmitted program identification and one of the stored program identifications. If no match is made, the program returns to step 324 and the program shown in FIG. 3A to look for the next message transmitted from the applique program 42. Steps 352 and 354 are carried out by software stored in and executed by the responsive key carrier 14.

However, if a key microprocessor 16 corresponding to the transmitted program identification has been inserted within the responsive key carrier 14, the program moves to step 356, which loads the received random seed corresponding to the randomly set count within the RND counter in the applique program into a storage location of the self-contained PROM 60 of the selected microprocessor key 16 for later use in the encryption process, and transmits an acknowledgement signal back to the APEC 12. Next, step 358 sets a register in the selected processor key 16 containing a pseudorandom sequence number to zero. The pseudorandom sequence number is the "encryption key" to be used by the microprocessor key 16 in a randomizing process to control a predictable sequence of pseudorandom encryptions of the customer identification. Illustratively, each transaction between the responsive key carrier 14 and the applique program 42 causes a pseudorandom generator associated with each of the APEC 12 and the microprocessor key 16 to increment its pseudorandom sequence number by one. The randomly generated seed is available to the encryption/decryption processes effected by both of the applique program 42 and the microprocessor key 14. The seed coordinates the generation of the pseudorandom numbers by both random number generators to be used as keys by each of the applique application program 42 and the microprocessor key 16, whereby each sequence of pseudorandom encryptions and decryptions of the customer identification is considered to be congruent.

The congruent encryption and decryption of the customer identification is a significant feature of this invention for preventing the continued execution of the requested application program 40 if the corresponding microprocessor key 16 is removed. For example, if a computer would be coupled to the communications port 48a after the commencement of execution of the application program 40, it would not be privy to the pseudorandom sequence number, as stored both within the APEC 12 and the microprocessor key 16. As a result, upon the occurrence of the next transaction with the APEC 12, that number is incremented within the APEC 12 to be used in the transmission and randomization of further messages between the APEC 12 and that device coupled to the communications port 48a; as a result, that device is not aware of the pseudorandom sequence number and cannot continue the dialog between the APEC 12 and its microprocessor key 16. Thus, if a microprocessor key 16 is coupled to the APEC 12 to provide an initiate authentication message and, thereafter, the microprocessor 16 is removed, access may be gained to the application program 40 stored in the memory 44 and a copy, in terms of a snap shot, of the memory contents may be obtained. However, the obtained copy of the application program is defective in that it is impossible to continue execution of the "snap shot" copy of the application program 14 without an authorized microprocessor key 16. In particular, the "snap shot" copy of the application program 40 is not aware of the stream of pseudorandom numbers and cannot continue to randomize and derandomize the further initiate authentication messages that are required to continue the execution of the application program 40.

The steps 360 and 362 effected by software in the microprocessor key 16a, bit-scramble and randomize the responsive authentication message to be transmitted from the microprocessor key 16 to the APEC 12. The responsive message consists of the predetermined customer identification and is bit-scrambled in accordance with the initial, fixed 8-bit scrambling pattern. Further, step 362 randomizes the message to be transmitted to the APEC 12 using the current pseudorandom number as generated by the random number generator associated with the microprocessor key 16. In an illustrative embodiment of this invention, the return message is exclusively ORed with the pseudorandom number. It is understood that upon receipt, the transmitted message is derandomized by performing a similar exclusive OR operation using a like or congruent pseudorandom number. Illustratively, upon the receipt of the next user access request message, the applique program 42 generates a new reset command, whereby a new seed is randomly generated and new first and second streams of pseudorandom numbers are generated. After step 362, the program returns to step 324 to re-enable the carrier bypass switch 52 to permit normal communications between the connected peripheral device and the APEC 12.

The routine shown in FIG. 3E is performed by software stored and executed by the responsive key carrier 14. If step 348 detects the presence of a software disable command, the program moves through entry point 7 to step 364 to set a disable timer to time a period of time during which the carrier bypass switch 52 will be closed and the further execution of the application program 40 will be defeated. The software disable command, thus, permits for the period of time user entry of further data via the keyboard 20 of the CRT 18 and the transmission to the peripheral device of specialized characters, which may inadvertently consist of streams of characters such as three nulls and thereby falsely activate the key carrier 14 causing unwanted interference with the peripheral device. Next, step 366 determines whether the external switch 15 is thrown "on" to render the carrier bypass switch 52 conductive, whereby the program returns to step 310 of FIG. 3A to energize the responsive key carrier LED to blink slowly. If the switch 15 is not thrown, step 368 determines whether the disable timer has expired and, if not, step 370 energizes the responsive key carrier LED slowly. The steps 366, 368 and 370 loop until the switch 15 is turned off or the disable timer has expired. After the disable timer has expired, as decided in step 368, the program returns to step 324, as explained above, and the key carrier 14 is once again enabled to operate normally should it receive a sequence of three nulls.

Referring now to FIG. 3F, if step 350 determines that the detected message is a next sequence command, the program moves through entry point 8 to step 374. The detection of the next sequence command indicates that another instruction of the application program 40 calling for the applique program 42 has been made for verification that a valid microprocessor key 16 is still coupled to the APEC 12. The next sequence command includes the second string of data including an encrypted version of the customer identification as originally embedded in the applique program 42. Illustratively, the customer identification may be encrypted in accordance with a DES algorithm using a predetermined "encryption key", as explained above. At the same time, a third string of data including the encrypted customer identification, but shifted one byte to the left, is also provided; as will be explained, the third string of data is available for a subsequent match with a return signal to be generated by the microprocessor key 16. The next sequence command is generated by the execution of the applique program 42. Thereafter, the next sequence command is transmitted to the microprocessor key 16, where the reset command is bit-descrambled in accordance with the selected bit-descrambling pattern. Next, step 374 generates the next pseudorandom number using a pseudorandom generator formed within the software of the key microprocessor 16. The next pseudorandom number is used as a key in the randomization/derandomization process, whereby the manner of randomization and derandomization changes with each communication between the applique program 42 and the microprocessor key 16. The randomly generated seed is used by the applique program 42 and the microprocessor key 16 to ensure congruence in the generation of the pseudorandom numbers and the respective randomization and derandomization processes.

The next sequence command was bit-descrambled in step 344 of FIG. 3C in accordance with a predetermined transformation pattern by the APEC 12 before being transmitted to the microprocessor key 16. Further, the message to be transmitted from the APEC 12 to the microprocessor key 16 is randomized using the pseudorandom number generated by the applique program 42. Illustratively, the message is randomized by exclusively ORing the data string of the message and the pseudorandom number. Then, step 376 unscrambles the reset command transmitted from the APEC 12 in accordance with the predetermined transformation pattern, before step 376 derandomizes the next sequence command including the customer identification. Illustratively, the transmitted next sequence command is exclusively ORed with the pseudorandom number generated at the microprocessor key 16 to provide a derandomized customer identification. The next sequence command initiates the authentication process to determine that a microprocessor key 16 is still coupled to the APEC 12 and that the coupled microprocessor key 12 has a corresponding customer identification. The derandomized customer's identification is compared in step 380 with a customer identification or serial number assigned to and stored within a memory of a particular microprocessor key 16. If a match is made between the transmitted and assigned customer identification, step 384 generates a return message from the coupled microprocessor 16 to the APEC 12 by performing a 2's complement and shift to the left operation on the data string comprising the customer identification to provide an indication to the APEC 12 that a match had been achieved. Conversely, if no match is made between the customer identifications, step 382 performs a similar 2's complement and shift right operation upon the customer identification to produce a signal indicative of a failure to validate the customer identification. Next, step 386 randomizes the return message as formed by either step 384 or 382 to be transmitted in step 388 to the APEC 12. As will be explained below, the applique program 42 receives and evaluates the return message from the microprocessor key 16 by comparing the received string of data with the retained third string. If there is a match, a code or signal is generated to permit continued execution of the corresponding application program 40. Conversely, if no match is made, a code or signal is generated denying further access or execution of the application program 40. Further, the APEC 12 responds to a return message from the microprocessor key 16 indicating that a customer identification match has been successfully made or not to allow the bypass switch 52 to be closed sooner than the completion of the fail safe time period that would normally permit the bypass switch 52 to be closed.

Figure 4A:
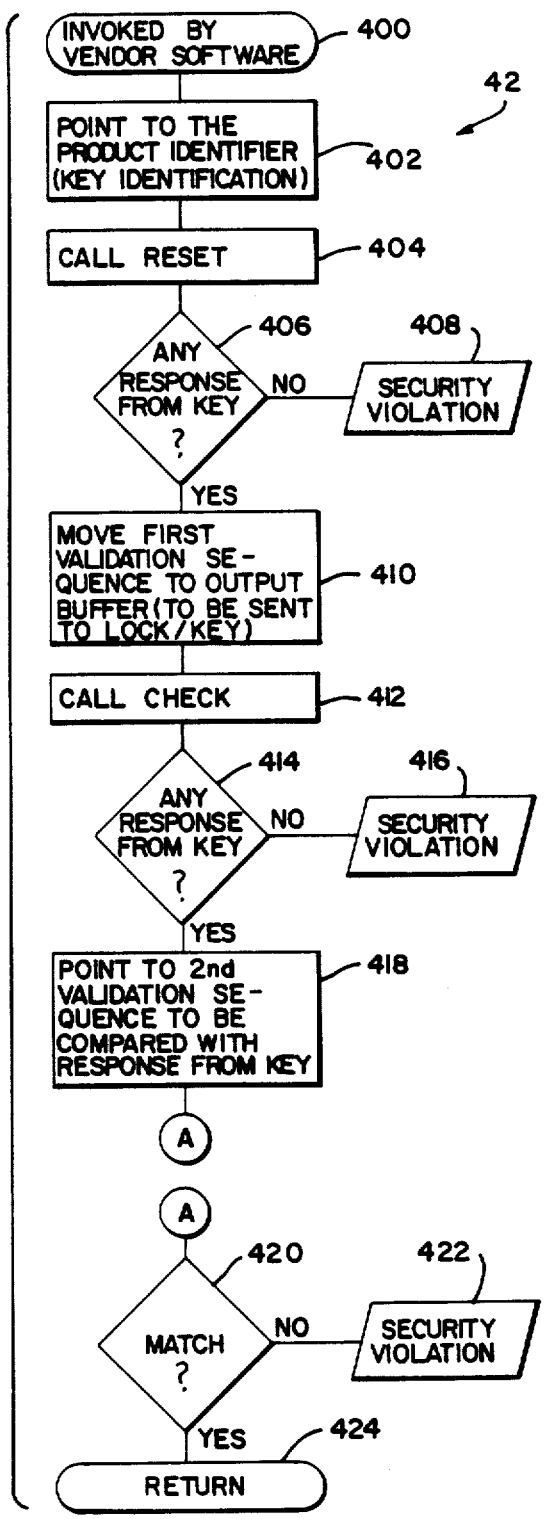
FIGS. 4A–4G comprise low level flow diagrams of the sequence of steps of the applique program embedded into the application program as illustrated in FIG. 1A.
Figure 4B:
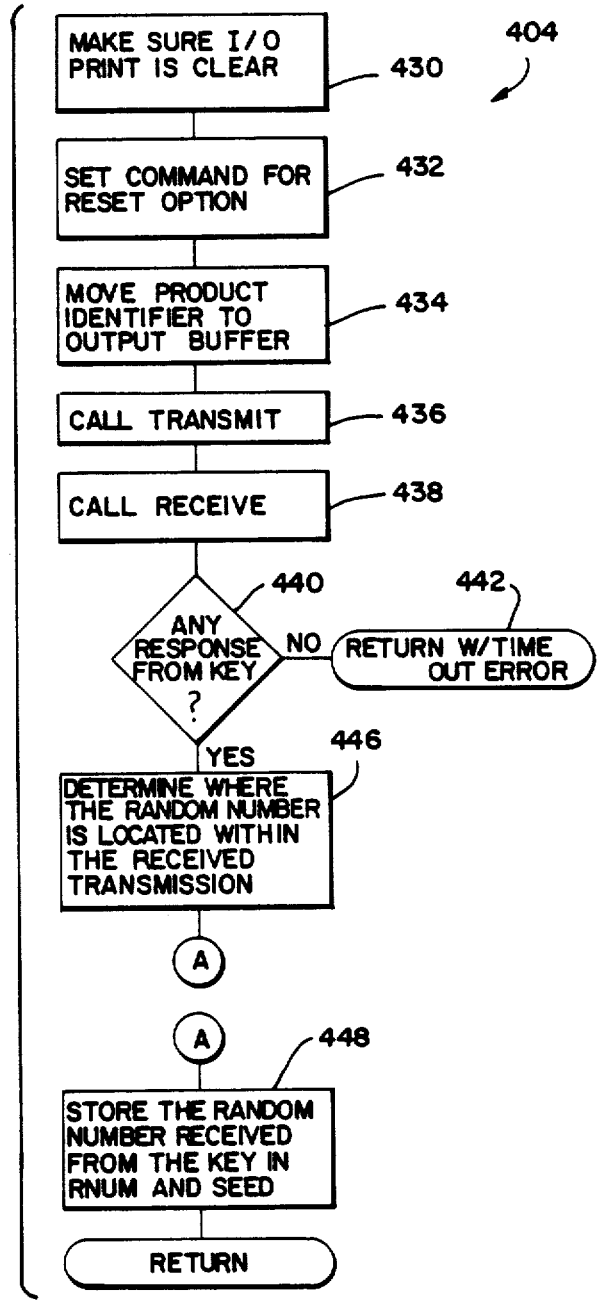

FIGS. 4A-4G illustrate the applique program 42 as embedded within the application program 40, as generally shown in Figure 1A. As will be described later, the application program 40 comprises a plurality of steps for carrying out any number of operations or functions, which are not of a concern to this invention. However, selected portions of said application steps selectively disposed throughout effect a call for the applique program 42, which is illustrated in the high level flow diagram of FIG. 4A. In particular, when an instruction within the application program 40 is executed to call the applique program 42, it is entered through step 400. After entry, step 402 accesses that particular portion of the applique program 42, wherein its program identification is stored. The program identification comprises the first string of data and particularly identifies the name or type of application program being protected. Thereafter, the RESET routine, as shown in FIG. 4B, is called to first determine whether a key carrier 14 is coupled to the communications port 48a of the APEC 12 and, if so, for determining whether a microprocessor key 16 corresponding to that program identification manifestation as embedded within the applique program 42 is coupled to the key carrier 14. If so, the RESET routine of step 404 sends a message initiating the authentication process, as will be explained below in detail. Step 406 looks for a response as would be transmitted back from the microprocessor key 16 to the APEC 12. If there is no response or an invalid response from a microprocessor key 16, the program moves to step 408 indicating a security violation, whereby access to the requested application program 40 is denied. Illustratively in step 408, a suitable manifestation may be provided to the requesting user. For example, a message could be displayed upon the CRT 28 of the peripheral device 18 indicating, for example, that access had been denied to the requested application 40 and providing material of an advertising nature indicating the source from which an authorized copy of the requested program may be obtained. Dependent upon the particular instructions incorporated within the applique program 42, any data that the unauthorized user had placed into the operating memory 44 could be scrambled. Such punitive action could be made more effective by delaying the scrambling for a period of time during which the unauthorized user could have spent considerable time in entering data.

On the other hand, if a response is received from a corresponding key microprocessor 16, step 410 loads the three above-described strings of data into an output buffer. In summary, the first string of data is the program identification manifestation as noted above. The second string of data, which is originally embedded into the applique program 42, is an encrypted version of the customer identification, i.e., that manifestation uniquely assigned to each customer. The method of originally encrypting the customer identification is predetermined. The third string of data corresponds to the second string, but is shifted one bit to the left, the third string of data is referred to as the matchable customer identification manifestation. Thereafter, the CHECK routine, as incorporated in step 412, is called to transmit the second string of data and to set a time period in which a response is to be made from the microprocessor key 16. As explained above, with respect to FIG. 3F, the microprocessor key 16 evaluates the second string of data with respect to a string of data stored therein indicative of that customer identification uniquely assigned to that microprocessor key 16. If there is a match between the transmitted and retained strings of data, the microprocessor key 16 shifts the transmitted string of data one bit to the left and transmits the shifted string of data back to the applique program 42. Step 414 determines whether the message is received from the microprocessor key 16 within the preset period; if not, the program moves to step 416 indicating a security violation and preventing the execution of the requested application program 40. If a response is received timely from the microprocessor key 16, the responsive message is loaded into an input buffer. Next in step 420, a comparison between the retained third string of data, as embedded in the applique program 42, is made with respect to the string of data transmitted from the processor key 16. Thus, it is seen that if an unauthorized user attempted to ascertain a customer's identification by observing repeated transmission of the data over the cable 20a between the microprocessor key 16 and the APEC 12, the unauthorized user would observe different sequences of data in the initiate authentication message, i.e., the next sequence command, transmitted from the APEC 12 to the microprocessor key 16 and that return message upon the microprocessor key 16 to the APEC 12. In particular, the microprocessor key 12 indicates, as explained above, a match by shifting the encrypted string of data containing its customer identification. If there is no match, the program moves to step 422 indicating a security violation. If a match is made, a return is made to the application program 40, thus, permitting its continued actuation. Thus, only after a successful comparison of the customer identification as embedded within the applique program 42 and that stored within the microprocessor key 16, is there a return and a continuing of the execution of the application program 40.

Referring now to FIG. 4B, the RESET routine as generally shown in step 404 of FIG. 4A, is shown in detail. Initially in step 430, the port 38*a* of the APEC 12 is cleared of previously entered data. Next, step 432 formulates the reset command including the second string of data indicative of the program identification manifestation corresponding to that program as requested by the user via terminal 18*a*, before step 434 loads the reset command into the output buffer and the XMIT routine, as generally shown in step 436, transmits the reset command to the microprocessor key 16. Thereafter, the RCV routine, as shown in step 438, waits for a response within a predetermined time period. Step 440 determines whether the response is received within the predetermined time period and, if not, a return is effected in step 442 to the main program, as seen in FIG. 4A and, in step 408, a security violation is noted by generating a prevent execution code or signal and further execution of the application program 40 is prevented. If a response is sensed within the preset period of time, step 446 identifies the randomly generated seed within the return message. As explained above with respect to FIG. 3A, step 320 as effected within the key carrier 14, determines randomly the seed to be used in each of the randomization and derandomization processes, as will be explained. Next, step 448 stores the seed in a designated area RNUM and SEED location, before effecting a return to the main program as shown in FIG. 4A.

Figure 4C:
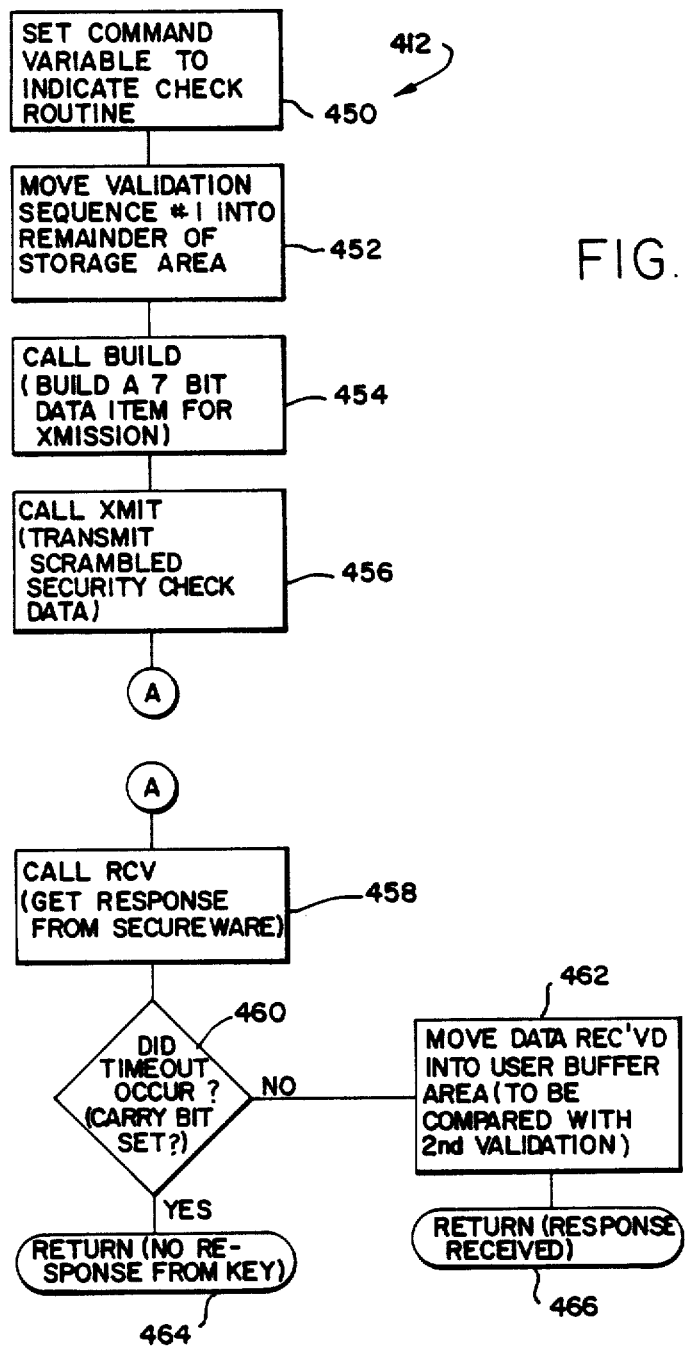

The CHECK routine, as shown generally in step 412 of FIG. 4A, is more specifically shown in FIG. 4C. Upon generation and placement of the reset command in the output buffer, a value or flag indicative thereof is set to call the CHECK routine. Thereafter, the customer identification in the form of the second string of data is placed into the output buffer. Thereafter, the BUILD routine, as generally shown in step 454, is called. The BUILD routine establishes a table storing a predetermined selected transformation pattern corresponding to that bit-descrambling method by which the message, as transmitted from the APEC 12 to the microprocessor key 16, is to be bit-scrambled. Thereafter, the XMIT routine, as shown in step 456, transmits each bit of the data transposed within the output buffer to the microprocessor key 16. Thereafter, the RCV routine, as shown in step 458, is executed to set a time period in which to receive a return message from the key carrier 14. If the time period has not timed out, as determined by step 460, step 462 transfers the responsive message from the microprocessor key 16 into a storage location, wherein the return data and, in particular, the encrypted customer identification may be compared with a customer identification in the form of the retained third string of data. Thereafter, a return 466 is returned to step 416 of the main program, as shown in FIG. 4A. If on the other hand, no response is received within the time period, a return is effected to step 418 of the main program.

Figure 4D:
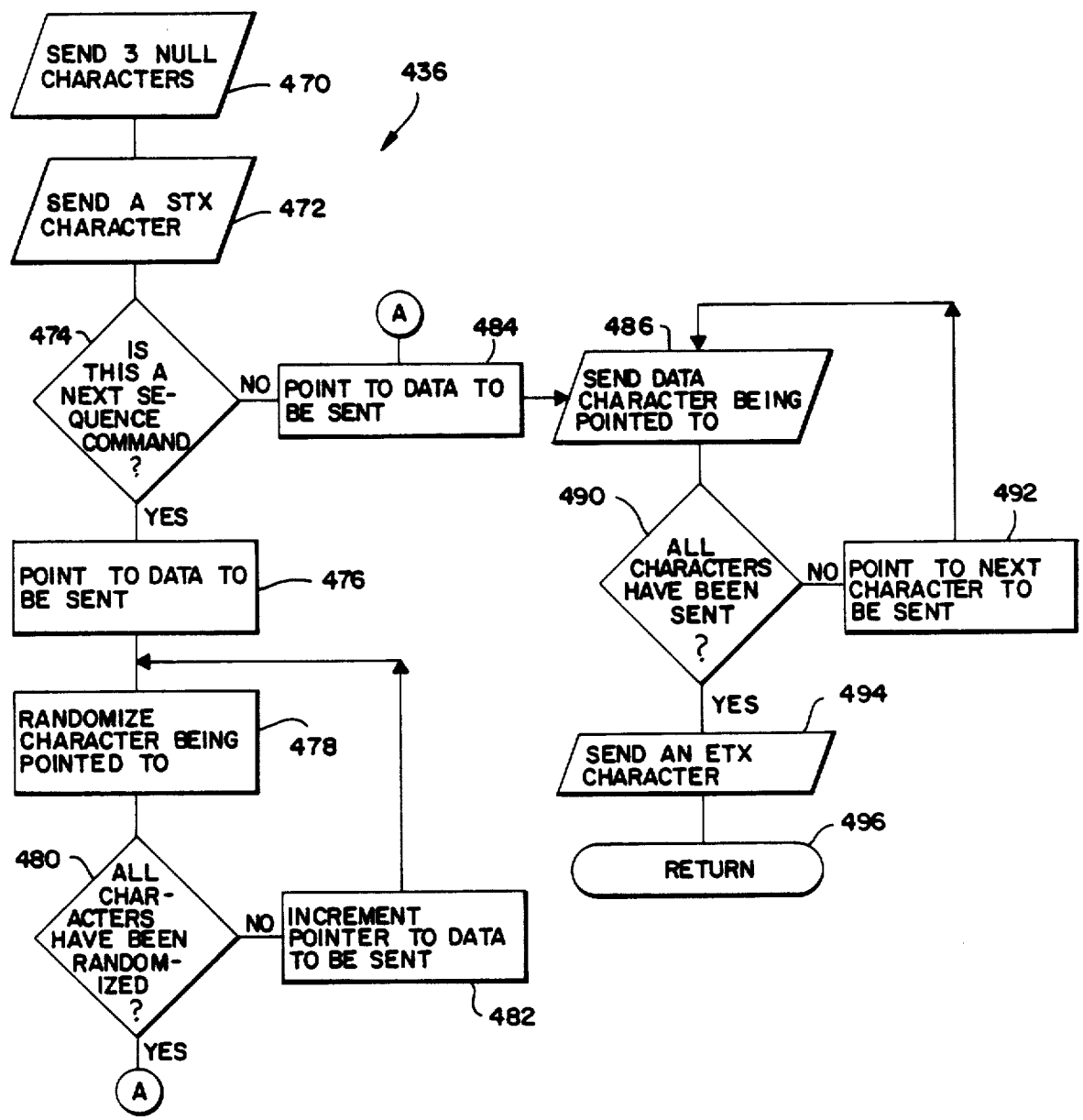

The XMIT routine, as generally shown in step 436 of FIG. 4B, is more particularly shown in FIG. 4D. Initially, step 470 transmits a sequence of three consecutive null characters that is used as a special signal to activate the key carrier 14 to receive a further message, as noted above. Next, step 472 transmits a STX character that is a particular character identifying the start of the message text. Thereafter, step 474 determines whether the message to be transmitted is a reset or a next sequence command. If a next sequence command, its address is determined, before step 478 randomizes each byte of the next sequence command one byte at a time by moving through steps 478, 480 and 482 until each character has been randomized. In an illustrative embodiment of this invention, step 478 randomizes the bits of each character by exclusively ORing them with the current pseudorandom number generated in response to the random seed as explained above. Then, the program moves to step 484. Similarly, if step 474 determines that the next character is a reset command, the routine moves also to step 484, which points to the data formulating the reset command and, thereafter, steps 486, 490 and 492 transmit each byte of the reset command one at a time. Thereafter, step 494 transmits an ETX character indicating the end of transmission of a message, before returning in step 496 to the RESET routine, as shown in FIG. 4B.

Figure 4E:
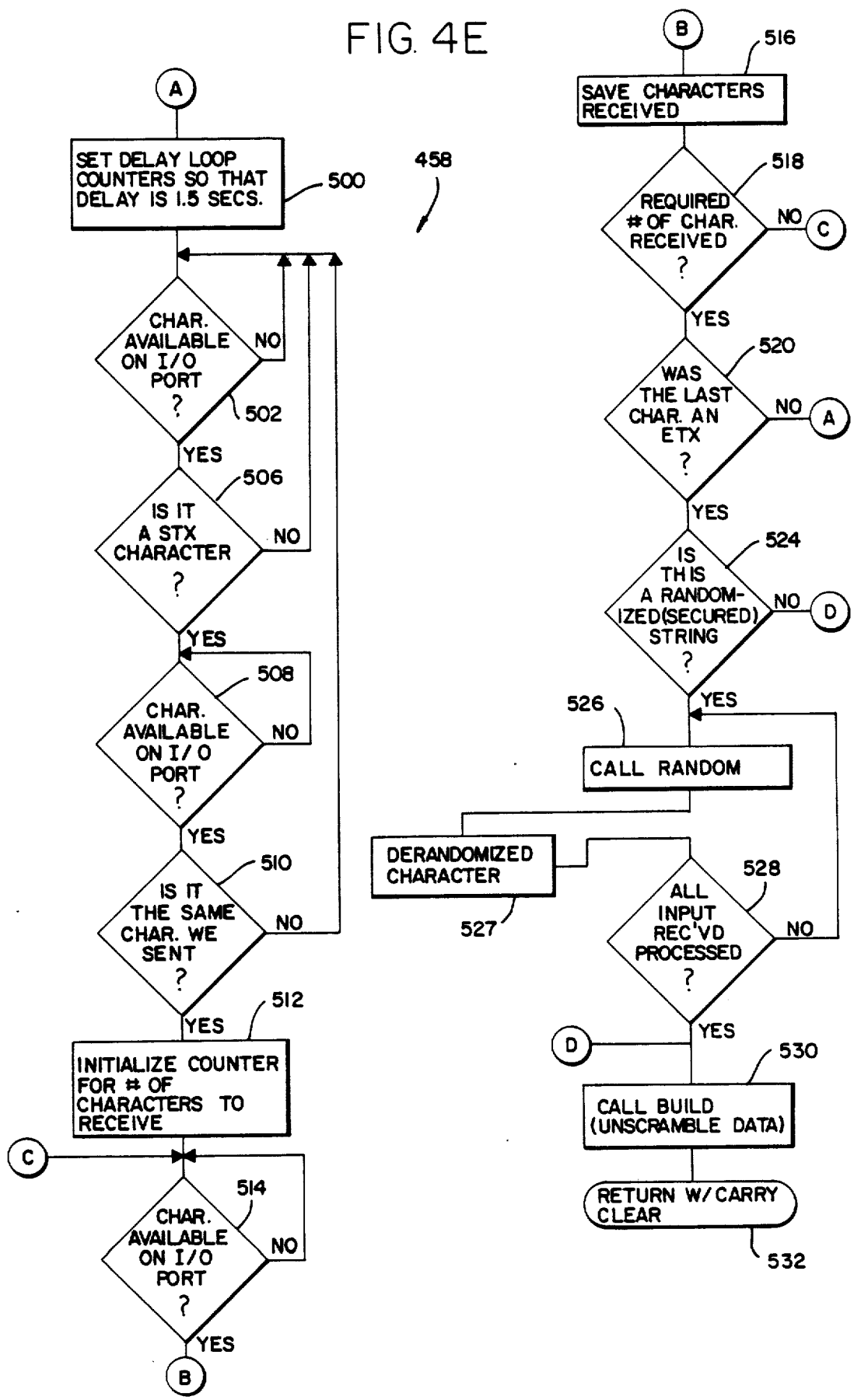

The RCV routine, as called in step 438 of the RESET routine of FIG. 4B and in step 458 of the CHECK routine of FIG. 4C, is more fully explained with respect to FIG. 4E. The RCV routine functions to receive a data string as transmitted from the microprocessor key 16 to the APEC 12, bit-descramble and derandomize the randomized data string. If no return message is returned within the predetermined period, an execute denial flag or code is set and the program returns to the application program 40, thus, preventing its further execution. Initially, in step 500, a counter is set to time the predetermined period, e.g., 1.5 seconds, within which to receive a response from the microprocessor key 16. Step 502 loops until a character is present at the communications port 48*a*. Step 506 determines whether that character is a STX character and, if not, loops through step 502 until a STX character is present at the communications port 48*a*. After the receipt of an STX character, step 508 looks for the presence of the next character of the message and, when present, step 510 determines whether the received character is the same as that transmitted, i.e., either a reset command or a next sequence command. Thereafter, step 512 sets a counter with the number of characters within the message to be received from the microprocessor key 16. Then, step 514 determines whether the next character is available upon the communications port 48*a*, before step 516 transfers the inputted character to the input buffer. Next, step 518 determines whether the counter formed in step 512 has timed out indicating that all of the characters have been received and, if not, returns to step 514. If all of the characters of a message have been received from the microprocessor key 16, step 520 determines whether the last character is an ETX and, if not indicating an invalid message, returns to step 500 to look for the next message. If a complete valid message has been received, step 524 determines whether the message is randomized. If not, the RCV routine moves to step 530 and, if randomized, to step 526 to call the RANDOM routine 526, whereby the next pseudorandom number of the string is generated. Next, step 527 derandomizes the received character illustratively by exclusively ORing the received character with the next pseudorandom number as obtained in step 526. Step 528 determines whether each character of the input message has been randomized and, if not, returns to the RANDOM routine of step 526. In the illustrative embodiment shown in FIG. 4E, each character is derandomized in accordance with a different pseudorandom number. When the input message has been derandomized, the BUILD routine of step 530 is called to descramble the inputted data, before returning in step 532 to the next step of each of the RESET and CHECK routines.

Figures 4F, 4G:
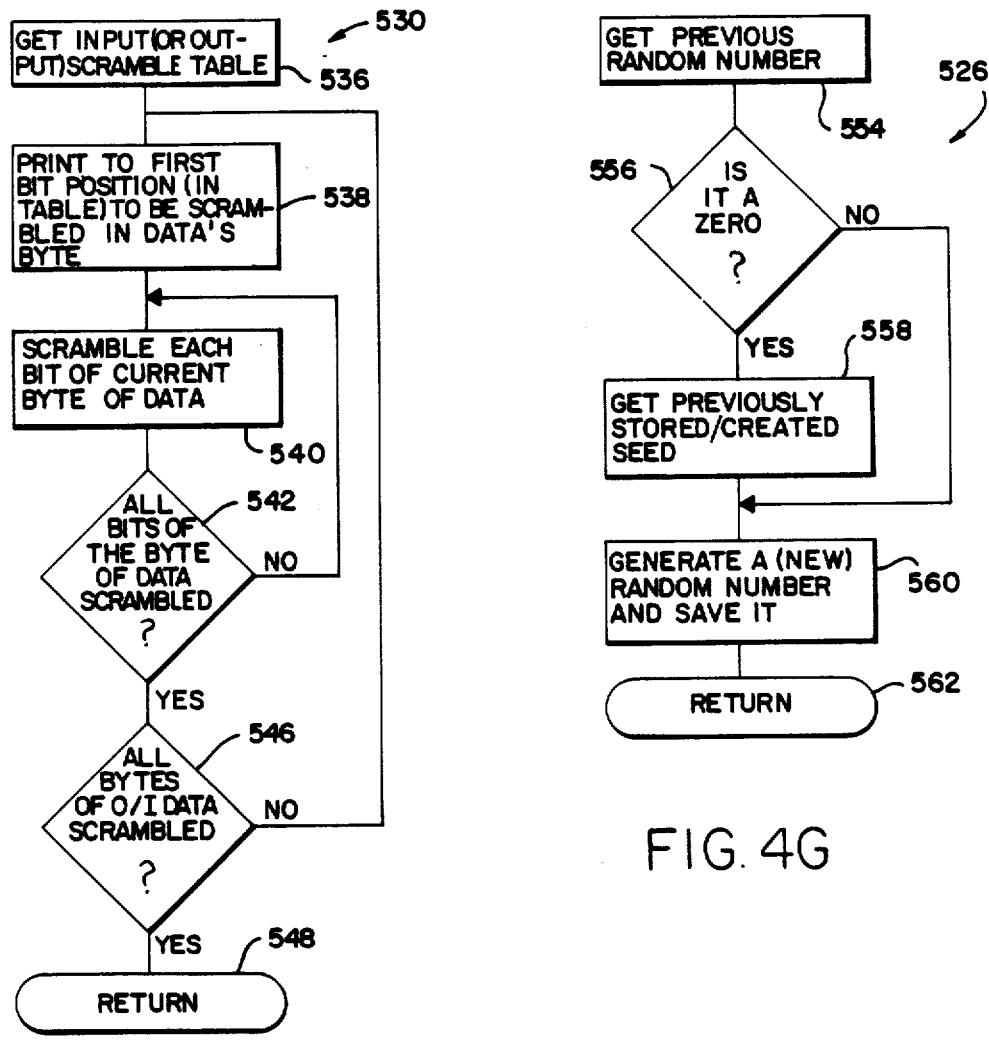

The BUILD routine, as illustrated in step 454 of FIG. 4C, and step 530 of FIG. 4E is more fully shown with respect to FIG. 4F. In particular, the BUILD routine serves to bit-scramble the bits of a data string as transmitted from the APEC 12 to a microprocessor key 16 and to bit-descramble a data string of a message transmitted from a microprocessor key 16 to the APEC 12. Initially, step 536 determines whether the message is a message to be scrambled or descrambled and a corresponding scrambling table or transformation pattern is obtained. Thereafter, step 538 points to the first bit of a message to be processed, before step 540 scrambles each bit of the corresponding character or byte within the data string. Then, step 542 determines whether each bit of a character has been scrambled and, if not, returns to step 540. After each bit of a character has been scrambled, step 546 determines whether all bytes of a message have been processed and, if not, the routine returns to step 538. If the scrambling or descrambling process has been completed, a return is made to one of the CHECK or RCV routines.

The RANDOM routine 526, as illustrated in FIG. 4E, is more fully explained with respect to FIG. 4G. The RANDOM routine serves as the random number generating means to generate the next random number in a sequence or stream of pseudorandom numbers. Initially, step 554 obtains the last pseudorandom number from its storage location within the applique program 42. If the pseudorandom number is a zero, as determined by step 556, the RANDOM routine moves to step 558 to access the randomly generated seed to reinitiate the generation of pseudorandom numbers at a starting point determined by the seed. If not, the RANDOM routine proceeds to step 560 to generate the next pseudorandom number within a stream. In an illustrative embodiment of this invention, the generation of a pseudorandom number is carried out in accordance with the mid-square method, as described in Volume II, THE ART OF COMPUTER PROGRAMMING by Donald Knuth (Published 1981). Thereafter, the return 562 is made to either the RCV routine or to step 478 of the XMIT routine.

It is a significant aspect of this invention to form a random generator in each of the applique program 42 and the microprocessor key 16. As explained above, a random seed is used to synchronize the corresponding streams of pseudorandom characters, i.e., the streams of pseudorandom numbers are congruent. In a first embodiment of this invention as explained above with respect to FIGS. 2A and 2B, a selected one of the pseudorandom numbers is used as an "encryption key" in one or a family of encryption algorithms in accordance with the DES standards. In this embodiment, it is contemplated that a relatively high degree of security is provided in that a sequence of different algorithms can be selected and that the encryption key is continuously changed. In a further embodiment of this invention as illustrated with respect to FIGS. 3A–3F and 4A–4G, a selected pseudorandom number is used to encrypt and, in particular, to randomize the message to be transmitted between the APEC 12 and the microprocessor key 16. Illustratively, the randomization is effected by exclusively ORing the data string of the message to be transmitted and the pseudorandom number. Upon the receipt, the randomized message is derandomized by exclusively ORing a similar or congruent pseudorandom number with the received message to obtain the originally transmitted message. Thus, it is contemplated that the congruent streams of pseudorandom numbers may be used with a variety of encryption or decryption processes, other than those specifically described herein. The terms "encryption" and "decryption" are used throughout this document in a generic sense As mentioned above, the application program 40 to be protected has a plurality of instructions. Most of the application program instructions relate to the various steps or functions implemented by the application program 40; the purpose or function of the steps, per se, is not of concern to this invention. However, one or more instructions calling the applique program 42 are variously embedded within the application program 40 to prevent the end user of the application program 40 to defeat the data access control system of this invention by obtaining an initial authorization for access to the application program 40 and, thereafter, removing the microprocessor key and continuing the execution of the application program 40. In that case, the subsequent instruction call to the applique program 42 would call the CHECK routine 412, as explained above in detail with respect to FIG. C, to transmit another initiate authentication message to the microprocessor key 16. If the microprocessor key 16 has been removed and cannot transmit the appropriate return message to the APEC 12, the application program 40 generates a signal or coded signal denying further use or execution of the protected application program 40. It is apparent that the effectiveness of this data access control system is enhanced by incorporating a number of instruction calls and variously embedding them within the application program 40 to make identification thereof difficult if not impossible.

Similarly, a potential end user may attempt to defeat the access control system of this invention by determining the aforementioned three strings of data corresponding to the program identification, the encrypted customer identification and the shifted customer identification, as explained above. In addition, the location for storage of the random seed and the current pseudorandom number would give the unauthorized user access to this data and be of potential use to the unauthorized user for defeating the data access control system of this invention. Similarly, it is desired to protect that coding resulting from the execution of the CHECK routine 412 and RESET routine 404 that serve to deny or grant access to the protected application program 40. These codes, as mentioned above, are embedded either within the application program 40 or the application program 42 by a variety of techniques that are well-known to those skilled in the programming art. There are many such embedding techniques that may be used to protect these codings. Illustratively, various techniques could be adopted by different vendors of the application program 40 that would be unique to each vendor, thus, making it even more difficult to defeat this data access control system. Thus, patent protection is not sought for such embedding techniques, per se.

Thus, there has been disclosed a data access control system for encrypting an access code or password in a truly random fashion that prevents an unauthorized user from observing a communication link coupled to the computer to ascertain the access code and, thus, to defeat the data access control system. Still further, the data access control of this system is readily usable with other peripheral devices not associated with the data access control functions of this invention and permits the use of nonprotected application programs in the same processor that executes protected application programs. Further, a copy of the protected application program may be made and, yet, any copy so made can only be executed by a uniquely matched key, i.e., the microprocessor key as described above.

In considering this invention, it should be remembered that the present disclosure is illustrative only and the scope of the invention should be determined by the appended claims.

We claim:

1. A software access control for limiting access to an executable program to an authorized user, said software access control system comprising:
   (a) data communication means for transmitting an access request message requesting permission to execute a selected program;
   (b) processor means comprising means for controlling access to said program, means for executing said program, first memory means for storing said program and a manifestation identifying said selected program, and first means coupled to said data communication means and responsive to the receipt of said access request message for transmitting an authentication message including said selected program identifying manifestation;
   (c) portable key means possessed by the authorized user and comprising second memory means for storing a program identifying manifestation assigned to said key means; and
   (d) means coupled to said processor means for releasably receiving said key means and responsive to said authentication message for detecting the presence of said portable key means and, if present, for applying said authentication to said portable key means;
   (e) said portable key means comprising means responsive to said applied authentication message for accessing said second memory means to obtain from said second memory means said assigned program identifying manifestation, for determining whether there is a match between said selected program identifying manifestation and said assigned program identifying manifestation and, if there is a match, for generating and transmitting to said access controlling means of said processor means an access granting signal whereby said access controlling means permits access to the executable program.

2. The software access control system as claimed in claim 1, wherein said key means comprises a programmed processor.

3. The software access control system as claimed in claim 1, wherein said selected program identifying manifestations is embedded in said program.

4. A software cross control system for limiting access to an executable program to an authorized user, said program having a first manifestation particularly identifying said program and a second manifestation particularly identifying an authorized user to be granted access to the executable program, said software access control system comprising:
   (a) data comunication means for transmitting an access request message requesting permission to execute a selected program;
   (b) processor means comprising means for executing said program, first memory means for storing a program and its first and second identifying manifestations, and first means responsive to the receipt of said access request message for transmitting a program authentication message including said selected first identifying manifestation;
   (c) portable key means possessed by the authorized user and comprising second memory means for storing an assigned first identifying manifestation assigned to said key means and identifying that program to which access is to be granted, and a second identifying manifestation assigned to said key means its authorized user;
   (d) means coupled to said processor for releasably receiving said portable key means and comprising means responsive to said program authentication message for determining the presence of said portable key means and, if present, for accessing said second memory means to obtain said assigned first identifying manifestation, and matching means for determining whether there is a match between said selected first identifying manifestation and said assigned first identifying manifestation indicating that a corresponding key means is coupled to said processor means;
   (e) said key means including means responsive to said match between said selected and assigned first identifying manifestations for obtaining said assigned second identifying manifestation from said second memory means and for transmitting said second assigned identification manifestation to said processor means; and
   (f) said processor means comprising matching means for obtaining from said first memory means said second identifying manifestation and for comparing said second identifying manifestation with said assigned second identifying manifestation to determine whether there is a match therebetween and, if there exists a match, for providing an access permission signal, said executing means responsive to said access permission signal for enabling the execution of said program.

5. The software access control system as claimed in claim 4, wherein said key means comprises a programmed processor.

6. The software access control system as claimed in claim 4, wherein said first and second identifying manifestations are embedded in said program.

7. A software access control system for limiting access to a protected program to an authorized user, said protected program having at least one manifestation particularly identifying an authorized user to be granted access to said protected program, said software access control system comprising:
   (a) data communication means for transmitting an access request message requesting permission to gain access to a selected protected program;
   (b) processor means comprising means for executing said protected program, first memory means for storing a program, and means responsive to the receipt of said access request message for transmtting a program authentication message indicative of said selected protected program if said selected protected program is stored in said first memory means;

(c) portable key means possessed by the authorized user and adapted to be coupled to said processor means and comprising second memory means for storing an identifying manifestation assigned to said key means and indicative of its authorized user; and (d) means coupled to said processor means for releasably receiving said portable key means and comprising means for receiving and analyzing said authentication message to determine whether said portable key means is present and, if present, for determining whether said authentication message is compatible with said key means;

(e) said key means including means, actuable if said program authentication message is compatible with said key means, for obtaining said assigned identifying manifestation from said second memory means and for transmitting said assigned identification manifestation to said processor means;

(f) said processor means further comprising matching means for receiving and comparing said assigned identifying manifestation with said identifying manifestations stored in said first memory means and, if there is a match, for providing an access permission signal.

8. The software access control system as claimed in claim 7, wherein said executing means is responsive to said access permission signal for enabling the execution of said selected protected program.

9. The software access control system as claimed in claim 7, wherein said identifying manifestation is embedded in said protected program.

10. A software access control system for limiting access to a protected program to an authorized user, said protected program having at least one manifestation particularly identifying an authorized user to be granted access to said protected program, said software access control system comprising:

(a) means for transmitting a program authentication message requesting permission to gain access to a selected protected program;

(b) processor means comprising means for executing said protected program and first memory means for storing a program;

(c) portable key means possessed by the authorized user and adapted to be coupled to said processor means and comprising second memory means for storing an identifying manifestation assigned to said key means and indicative of its authorized user; and (d) means coupled to said transmitting means for receiving releasably said key means, and comprising means for receiving and analyzing said authentication message to determine whether said portable key means is present and, if so, to determine whether it is compatible with said key means;

(e) said key means including means, actuatable if said program authentication message is compatible with said key means, for obtaining said assigned identifying manifestation from said second memory means and for transmitting said assigned identification manifestation to said processor means;

(f) said processor means further comprising matching means for receiving and comparing said assigned identifying manifestation with said identifying manifestations stored in said first memory means and, if there is a match, for providing an access permission signal.

11. A software access control system for limiting access to a plurality of protected programs to authorized users, each of said protected programs having a list of manifestations, each manifestation identifying an authorized user to be granted access to a corresponding program, said software access control system comprising:

(a) processor means comprising means for controlling access to said protected programs, first memory means for storing said plurality of programs and said list of user identifying manifestations, means for generating and transmitting an access request message requesting permission to gain access to a selected one of said plurality of protected programs;

(b) portable key means possessed by an authorized user and comprising second memory means for storing a user identifying manifestation assigned to said key means; and (c) means for releasably receiving said portable key means, said receiving means comprising means for determining the presence of said portable key means and, if present, for applying said access request message to said received portable key means;

(d) said portable key means comprising means for interpreting said applied access request message to determine whether it is compatible with said key means, and means for transmitting said assigned user identifying manifestation if said interpreted access request message is compatible with said key means;

(e) said access controlling means coupled to said transmitting means to receive said user assigned identifying manifestation for determining whether said transmitted, assigned user identifying manifestation matches one of said list of user identifying manifestations of said selected one protected program and, if there is a match, for granting user access to said selected protected program.

12. The software access control system as claimed in claim 11, wherein said receiving means comprises means for releasedly receiving a plurality of said key means and means coupled to receive said access request message for applying said access request message in order to each of said key means presently associated with said receiving means.

* * * * *